(12) United States Patent
Kobayashi et al.

(10) Patent No.: US 8,059,829 B2
(45) Date of Patent: Nov. 15, 2011

(54) SOUND EFFECT PRODUCING APPARATUS FOR VEHICLE

(75) Inventors: Yasunori Kobayashi, Utsunomiya (JP); Toshio Inoue, Tochigi-ken (JP); Akira Takahashi, Tochigi-ken (JP); Kosuke Sakamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1264 days.

(21) Appl. No.: 11/714,779

(22) Filed: Mar. 7, 2007

(65) Prior Publication Data

US 2007/0223727 A1    Sep. 27, 2007

(30) Foreign Application Priority Data

Mar. 24, 2006  (JP) ................................. 2006-083772
Mar. 24, 2006  (JP) ................................. 2006-083796

(51) Int. Cl.
*H04B 1/00*   (2006.01)
*H03G 3/20*   (2006.01)
*H03G 3/00*   (2006.01)

(52) U.S. Cl. ............................. 381/86; 381/57; 381/61

(58) Field of Classification Search .................... 381/86, 381/56–58, 61
See application file for complete search history.

(56) References Cited

U.S. PATENT DOCUMENTS

| 5,371,802 | A |   | 12/1994 | McDonald et al. |
|---|---|---|---|---|
| 5,635,903 | A | * | 6/1997 | Koike et al. .................. 340/441 |
| 5,835,605 | A |   | 11/1998 | Kunimoto |
| 2004/0219981 | A1 |   | 11/2004 | Bando |

FOREIGN PATENT DOCUMENTS

| JP | 52-73772 | 6/1977 |
|---|---|---|
| JP | 54-8027 | 1/1979 |
| JP | 60-261297 A | 12/1985 |
| JP | 05-080790 A | 4/1993 |
| JP | 08-076772 A | 3/1996 |
| JP | 8-152894 A | 6/1996 |
| JP | 09-098493 A | 4/1997 |
| JP | 2004-326057 A | 11/2004 |
| JP | 2004-329290 A1 | 11/2004 |
| JP | 2006-001524 A | 1/2006 |

\* cited by examiner

*Primary Examiner* — Devona Faulk
*Assistant Examiner* — George Monikang
(74) *Attorney, Agent, or Firm* — Arent Fox LLP

(57) ABSTRACT

A processor determines an engagement state of a clutch based on a clutch signal, which is output from a clutch switch connected to a clutch pedal. In a declutching state, the processor lowers weighting gain characteristics that serve as acoustic correcting characteristics used in a sound pressure adjuster. Therefore, even when a change of an engine rotational frequency per unit of time increases during a shift-change operation, the gain of the control signal is prevented from increasing. Accordingly, a gap between real acceleration of the vehicle and a sound effect output from a speaker can be decreased, thereby reducing the possibility that the driver and/or a passenger in the vehicle may feel a sense of strangeness relative to the sound effect.

9 Claims, 16 Drawing Sheets

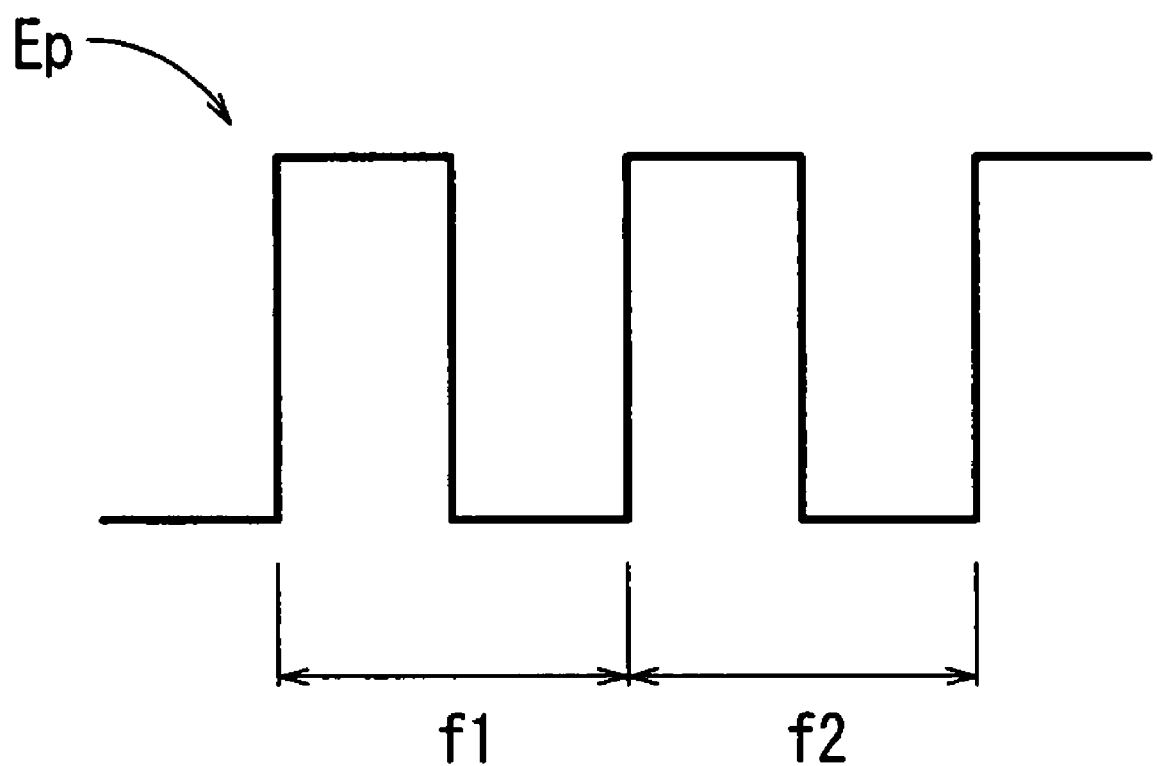

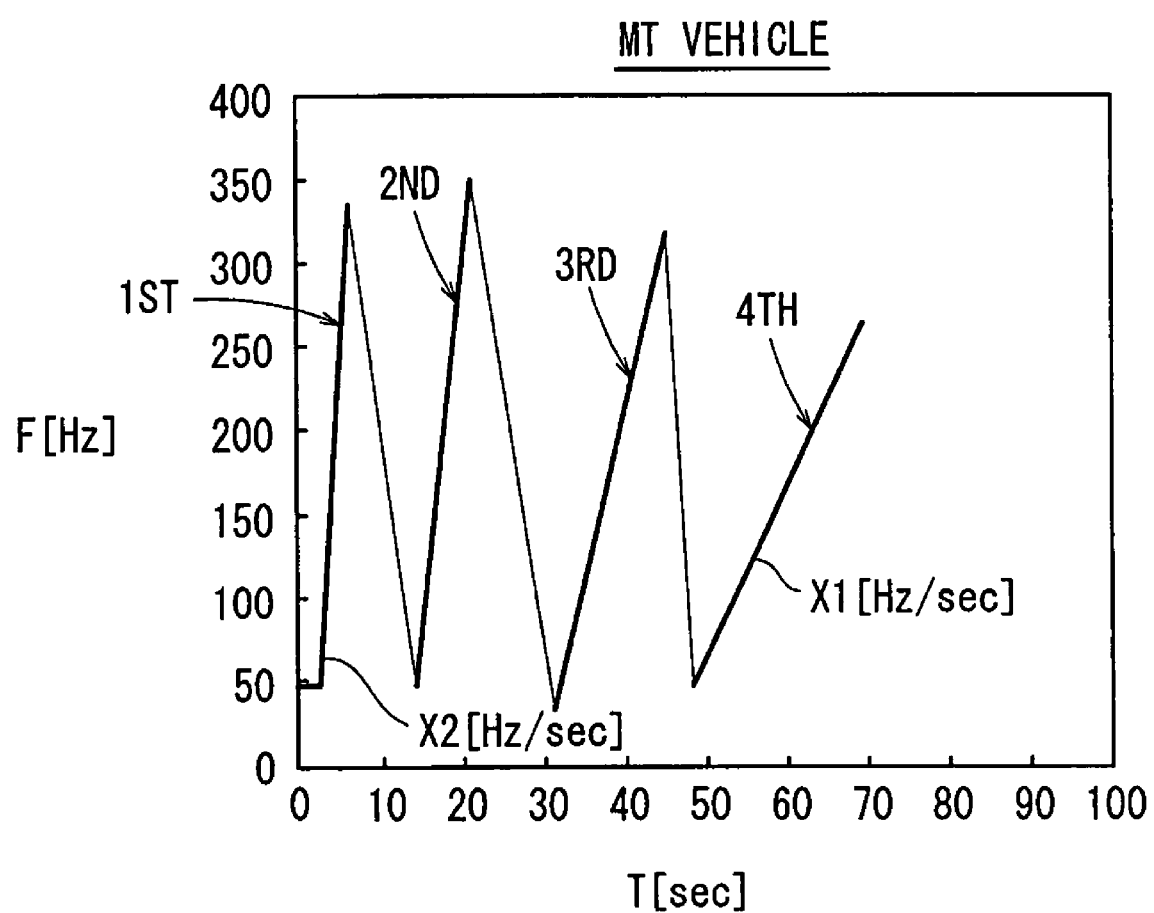

SOUND EFFECT PRODUCING APPARATUS
FOR VEHICLE

CROSS-REFERENCE TO RELATED
APPLICATION

This application claims the priority of JP Application No. 2006-083772, filed Mar. 24, 2006 and JP Application No. 2006-083796, filed Mar. 24, 2006, the entire specification, claims and drawings of which are incorporated herewith by reference.

BACKGROUND OF THE INVENTION

1. Field of the Invention

The present invention relates to an apparatus for producing a sound effect in a vehicle, depending on sound source information, including vehicle driving state information or engine operation information.

2. Description of the Related Art

Heretofore, there have been proposed in the art a sound effect producing apparatus for detecting accelerating or decelerating actions made by a driver, and producing and radiating a sound effect into the vehicle cabin, depending on the acceleration or deceleration of the vehicle, by means of a speaker installed in the vehicle cabin, as disclosed in Japanese Laid-Open Patent Publication No. 54-8027 and U.S. Pat. No. 5,371,802.

According to the disclosed sound effect producing apparatus, when the rotational speed (rotational frequency) of a motor vehicle engine increases in response to an accelerating action made by the driver, a sound effect having a high frequency and a large sound level is generated depending on the increase in the engine rotational speed, wherein the sound effect is radiated from the speaker into the vehicle cabin in order to create a staged sound atmosphere in the vehicle cabin.

However, according to the conventional apparatus, which produces a sound effect depending on the rotational speed of the engine, during declutching, there is no correlation between the increase or decrease of the engine rotational speed and actual acceleration or deceleration of the vehicle. For example, when the clutch is disengaged and the accelerator pedal is pressed during downshifting, the engine rotational speed increases and the sound effect becomes larger, even though the actual speed of the vehicle stays constant or decreases. Such a gap may seem strange to the driver or to a passenger riding in the vehicle.

On the other hand, in some situations, it would be better to produce a large sound effect even when the clutch is disengaged. For example, when the clutch is disengaged but the driver uses a driving technique known as "heel-and-toe", the driver or passenger would not sense any strangeness when the sound effect is made larger.

Generally, the "heel-and-toe" operation is one type of driving technique that is used during downshifting. As its name suggests, during heel-and-toe operations, a downshift operation is performed by both the right heel of the foot heel as well as the right toe. Such a heel-and-toe operation, for example, may be carried out as follows. In order to negotiate a curve, (a) the driver uses his or her right toe in order to apply the brake before reaching the curve so as to decrease the speed of the vehicle; (b) the driver uses his or her left foot in order to push in the clutch pedal and thereby disengage the clutch; (c) the driver uses his or her right heel in order to push the accelerator pedal so that the engine rotational speed stays substantially the same as the wheel rotational speed, while the driver then returns the clutch pedal in order to reengage the clutch to perform downshifting; and (d) the driver pushes the accelerator pedal in order to accelerate the vehicle. According to the above operations, the vehicle is decelerated before reaching the curve and downshifting is performed smoothly. Then, the vehicle is re-accelerated to pass through the curve smoothly and quickly.

During the above operation (c), the engine rotational speed increases while the clutch is disengaged. Therefore, there is no correlation between engine rotational speed and actual acceleration of the vehicle. However, when the heel-and-toe operation is performed, the above operations are performed only for a very short period of time, e.g., for 1 to 2 seconds. Accordingly, the driver or passenger does not experience a strange feeling as a result of the sound effect becoming larger when the engine rotational speed is increased.

Such a situation, where it is better to increase the sound effect during a heel-and-toe operation, can apply not only to cases of using the apparatus for producing a sound effect depending on engine rotational speed, but also to cases of using an apparatus for producing a sound effect depending, for example, on the velocity of the vehicle. In such an apparatus, the sound effect ordinarily will not be increased even when the accelerator pedal is pressed, since the vehicle is decelerated during downshifting using the heel-and-toe operation. However, in order to highlight the heel-and-toe operation, actually it would still be better to increase the sound effect.

SUMMARY OF THE INVENTION

The present invention has been made in view of the above problems. Thus, an object of the present invention is to provide a sound effect producing apparatus for a vehicle, which is capable of producing a natural sound effect during downshifting.

Another object of the present invention is to provide a sound effect producing apparatus for a vehicle, which is capable of producing a natural sound effect during heel-and-toe operations.

According to the present invention, a sound effect producing apparatus for a vehicle is provided, comprising a waveform data table for storing waveform data within one cyclic period; a frequency detector for detecting an engine rotational frequency; a reference signal generator for generating a harmonic reference signal based on the engine rotational frequency by successively reading the waveform data from the waveform data table; a processor for generating a control signal based on the reference signal; a clutch signal generator for generating a clutch signal indicating an engagement state of the clutch and outputting the clutch signal to the processor; and an output means for converting the control signal into the sound effect and outputting the sound effect. The processor changes a gain of the control signal, depending on a change in the engine rotational frequency per unit of time, such that the gain during declutching is lower than the gain during clutching.

With the above arrangement, when the clutch of the vehicle is disengaged, the gain of the control signal based on the reference signal is lowered. Therefore, even when the engine rotational frequency increases during a downshifting operation, an increase in the gain of the control signal is prohibited. Accordingly, a gap between the actual vehicle acceleration and the sound effect output from the output means can be decreased, thereby reducing the possibility that the driver or passenger experiences a strange feeling relative to the sound effect.

The clutch signal generator preferably generates the clutch signal depending on a pressed state of a clutch pedal that is connected to the clutch. Accordingly, even when no sensor is provided with the clutch itself for detecting a connected state of the clutch, it is still possible to determine the connected state of the clutch. Therefore, design changes of the clutch and the surrounding devices, for which control thereof is generally important and complicated, are not required. Thus, the connected state of the clutch can be determined easily.

The sound effect producing apparatus may further comprise a normal gain table, which includes gain values of the control signal when the clutch pedal is not pressed; and a shift-change gain table, which includes gain values of the control signal when the clutch pedal is pressed.

According to another aspect of the present invention, there is provided a sound effect producing apparatus for a vehicle that produces a sound effect based on sound source information including vehicle driving state information or engine operation information, comprising: a sound source information detector for detecting the sound source information; a processor for generating a control signal for producing the sound effect, based on the sound source information; an output means for converting the control signal into the sound effect and outputting the sound effect; and a clutch signal generator for generating a clutch signal indicating an engagement state of the clutch and outputting the clutch signal to the processor. The processor calculates a declutching time based on the clutch signal and changes a gain of the control signal when the declutching time is within a predetermined time and when a predetermined parameter regarding the sound source information exceeds a predetermined value.

With the above arrangement, when the declutching time is within the predetermined time and when the predetermined parameter regarding the sound source information exceeds the predetermined value, the processor can determine that a heel-and-toe operation is being performed and thereby change the gain of the control signal for producing the sound effect. Therefore, it is possible to produce a natural sound effect during heel-and-toe operations.

The sound source information may include information regarding an engine rotational frequency, vehicle velocity, a gate opening degree of an accelerator, or a gate opening degree of a throttle.

The clutch signal generator preferably generates the clutch signal, depending on a pressed state of a clutch pedal that is connected to the clutch. Accordingly, even when no sensor is provided with the clutch itself for detecting an engagement state of the clutch, it is still possible to determine the engagement state of the clutch. Therefore, design changes of the clutch and the surrounding devices, for which the control thereof is generally important and complicated, are not required. Thus, the engagement state of the clutch can be determined easily.

The sound source information may include an engine rotational frequency, and the predetermined parameter may include a change of the engine rotational frequency per unit of time.

Since the change of the engine rotational frequency per unit of time is used as the predetermined parameter, it is possible to reliably detect heel-and-toe operations even when the velocity or acceleration of the vehicle does not change or decreases.

The processor preferably changes the gain of the control signal, depending on the change in the engine rotational frequency per unit of time, wherein the gain includes gain values during clutching and gain values during declutching. The gain values during declutching include a gain value when the declutching time is within the predetermined time and the change of engine rotational frequency per unit of time exceeds the predetermined value, and a gain value for other situations.

Accordingly, the gain can be set to at least three states, the first of which is a clutching state, the second of which is a declutching state with the heel-and-toe operation, and the third of which is a declutching state without the heel-and-toe operation. Therefore, a more natural sound effect can be produced.

The sound source information may include vehicle velocity, and the predetermined parameter may include a change of the engine rotational frequency per unit of time.

Since the sound source information includes the vehicle velocity, it is possible to eliminate the gap between the engine rotational frequency and the actual velocity or acceleration of the vehicle that occurs during declutching. Further, since a change in the engine rotational frequency per unit of time is used as the predetermined parameter, heel-and-toe operations can reliably be detected even when the velocity or acceleration of the vehicle does not change or decreases.

The processor preferably changes the gain of the control signal depending on vehicle acceleration, such that a value of gain, when the declutching time is within the predetermined time and the change of the engine rotational frequency per unit of time exceeds a predetermined value, is made larger than a value of gain for other situation.

According to the arrangement in which the gain for the control signal is changed depending on vehicle acceleration, an increase in the engine rotational frequency during declutching does not change the gain directly. However, with such an arrangement, when the engine rotational frequency increases during declutching, the gain can be increased. Therefore, it is possible to produce a natural sound effect during heel-and-toe operations.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a diagram showing a waveform of engine pulses;

FIG. 7 is a diagram showing shift change characteristics of a manual transmission vehicle;

DESCRIPTION OF THE PREFERRED EMBODIMENTS

Embodiments of the present invention shall be described below with reference to the attached drawings.

A. First Embodiment

1. Summary of Mechanism for Producing Sound Effect

Figure 1:
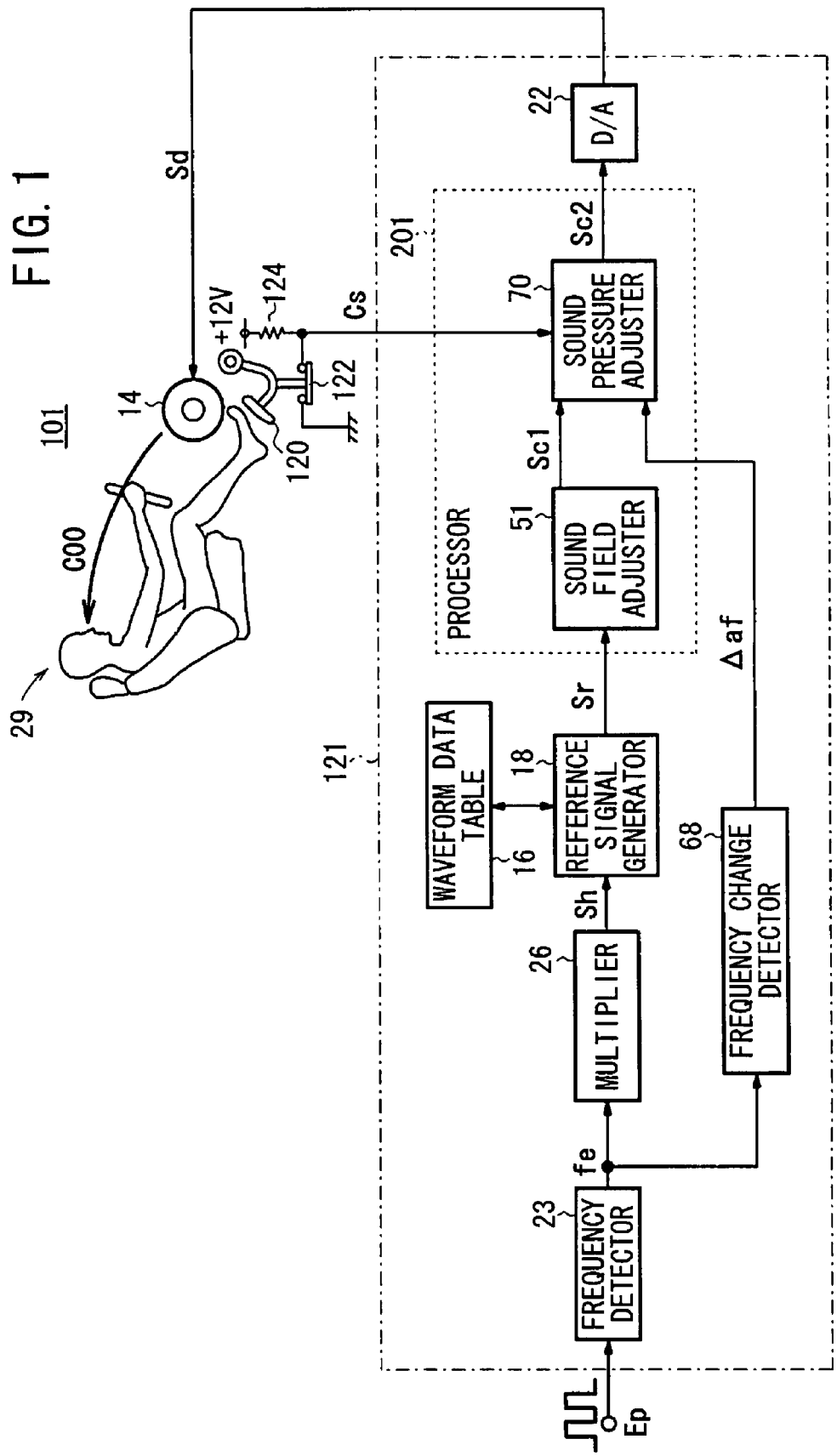
FIG. 1 is a block diagram of a sound effect producing apparatus for a vehicle according to a first embodiment of the present invention.

FIG. 1 shows in block form a sound effect producing apparatus 101 for a vehicle according to a first embodiment of the present invention.

The sound effect producing apparatus 101 is intended for use with a manual transmission vehicle (MT vehicle), in which a sound effect is produced depending on the rotational speed of an engine (not shown) installed in the vehicle, so as to create a staged sound atmosphere during driving. A summary of the mechanism for producing such a sound effect is as follows.

Specifically, a frequency detector 23 such as a frequency counter detects a frequency of engine pulses Ep (engine rotational frequency fe) [Hz] obtained by a sensor such as a Hall-effect device that detects the rotations of an output shaft of the engine. Then, a multiplier 26, which operates as a frequency converter, multiplies the engine rotational frequency fe detected by the frequency detector 23 so as to generate a harmonic signal Sh, which has a higher frequency, based on the engine rotational frequency fe. Next, a reference signal generator 18 processes the harmonic signal Sh together with waveform data that is stored in a waveform data table 16, in order to generate a reference signal Sr. A processor 201 generates a control signal Sc1 based on the reference signal Sr, and then generates a control signal Sc2 based on the control signal Sc1. A digital/analogue converter (D/A converter) 22 converts the control signal Sc2 into an analogue control signal Sd. A speaker 14 outputs a sound effect based on the control signal Sd. An output amplifier (not shown) is connected between the D/A converter 22 and the speaker 14, such that the amplifier gain may be varied by the passenger.

In the present embodiment, a frequency change detector 68, which calculates a change Δaf [Hz/sec] of the engine rotational frequency fe per unit of time, is provided. The frequency change Δaf is output to the processor 201 and used in the processor 201 for converting the control signal Sc1 into the control signal Sc2.

Further, in the present embodiment, a clutch switch 122 connected to a clutch pedal 120 detects a pressed-in state of the clutch pedal 120 in order to generate a clutch signal Cs indicating the engagement state of the clutch (not shown). The clutch signal Cs is output to the processor 201 and used therein for converting the control signal Sc1 into the control signal Sc2.

The frequency detector 23, the multiplier 26, the reference signal generator 18, the waveform data table 16, the processor 201 and the frequency change detector 68 are mounted in the dashboard of a motor vehicle, and constitute an ECU (Electronic Control Unit) 121 serving as a general processor.

The speaker 14 serves to apply sounds to a driver and/or passenger in a passenger position 29, such as a driver's seat or a front passenger seat. The speaker 14 is fixedly disposed on a panel in each of the front doors located on opposite sides of the motor vehicle, or on each of the kick panels located on opposite sides of the motor vehicle, i.e., door-side inner panel surfaces alongside a driver leg space. The speaker 14 may alternatively be disposed beneath the center of the dashboard.

2. Harmonic Signal Sh (Multiplier 26)

As mentioned above, the multiplier 26 generates a harmonic signal Sh, which acts as a higher frequency signal, based on the engine rotational frequency fe detected by the frequency detector 23. Specifically, the multiplier 26 generates a harmonic signal Sh having n times (e.g., 6 times) the frequency fe (e.g., 6 fe) as the fundamental frequency. The multiplier 26 may multiply the engine rotational frequency fe by an integer such as 2, 3, 4, 5, 6, . . . or by a real number such as 2.5, 3.3, . . . .

In the present embodiment, a single multiplier 26 is connected in series to the frequency detector 23. Alternatively, a plurality of multipliers 26 may be provided in parallel so as to output plural harmonic signals Sh representing different times (e.g. 4, 5 and 6 times) of the frequency. Alternatively, the multiplier 26 may be dispensed with.

3. Reference Signal Sr (Reference Signal Generator 18 and Waveform Data Table 16)

As mentioned above, the reference signal generator 18 generates a reference signal Sr based on the harmonic signal Sh and the waveform data stored in the waveform data table 16.

The reference signal Sr is generated by means of the waveform data table 16 and is stored in a memory.

Figure 2:
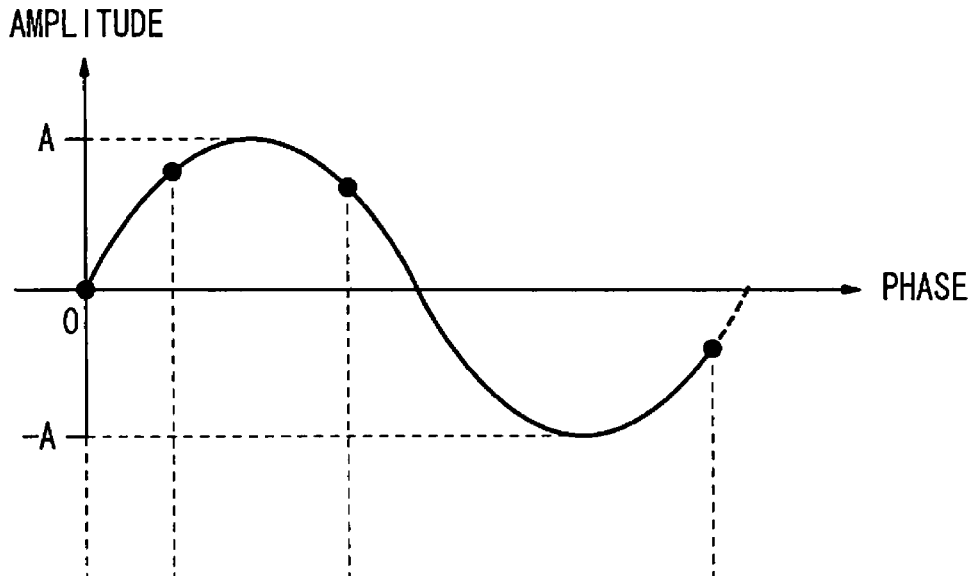
FIG. 2A is a diagram showing waveform data stored in a waveform data table in the sound effect producing apparatus.
FIG. 2B is a diagram showing a sine wave, which is generated by referring to the waveform data memory.

As schematically shown in FIGS. 2A and 2B, the waveform data table 16 comprises instantaneous value data, stored as waveform data at respective addresses, wherein the instantaneous value data represents a predetermined number (N) of instantaneous values into which the waveform of a sine wave during one cyclic period is divided at equal intervals along a time axis (=phase axis). The addresses (i) are indicated by integers (i=0, 1, 2, . . . , N−1) ranging from 0 to N−1. An amplitude value A, as shown in FIGS. 2A and 2B, is represented by 1 or any desired positive real number. Therefore, the waveform data at the address i is calculated as $A \sin(360 \times i/N)$. Stated otherwise, one cycle of a sine waveform is divided into N sampled values at sampling points spaced over time, wherein data generated by quantizing the instantaneous values of the sine wave at the respective sampling points is stored in the memory as waveform data at respective addresses represented by the respective sampling points.

The reference signal generator 18 generates a reference signal Sr, which comprises a sine-wave signal having a frequency corresponding to the frequency of the harmonic signal Sh. The reference signal generator 18 generates the reference signal Sr when it reads the waveform data from the waveform data table 16, while changing the readout address period depending on the period of the harmonic signal Sh that is applied to the reference signal generator 18.

If a plurality of multipliers 26 are provided, which generate a plurality of harmonic signals Sh having different frequencies, a plurality of reference signals Sr are generated by means of an arrangement including a plurality of reference signal generators 18 or the like.

4. Control Signal Sc2, Frequency Change Δaf and Clutch Signal Cs (Processor 201, Frequency Change Detector 68 and Clutch Switch 122)

As shown in FIG. 1, the processor 201, which changes the reference signal Sr acoustically so as to output the control signal Sc2, includes a sound field adjuster 51 and a sound pressure adjuster 70, each of which serves as a acoustic corrector. The sound field adjuster 51 performs a "sound field adjusting process" (also referred to as a "flattening process"), a "frequency emphasizing process" and a "degree-specific correcting process", details of which shall be discussed below. The sound pressure adjuster 70 performs a "sound pressure adjusting process", details of which shall be discussed later.

(1) Sound Field Adjusting Process (Flattening Process)

The vehicle cabin, which acts as a sound field, has acoustic characteristics (sound-field characteristics, frequency transfer characteristics, or sound-field gain characteristics), which are different for each position therein. There are frequencies that are heard easily as well as frequencies that can barely be heard depending on the passengers' positions within the vehicle cabin, such as the driver's seat and rear seat. Specifically, referring to the gain characteristic curve 39 shown in FIG. 3, it has been known that there are peaks and dips in the acoustic characteristics between the speaker position and the passengers' positions.

Therefore, even when the frequency and the sound level of the sound effect radiated from the speaker are increased linearly in proportion to the acceleration of the vehicle, since the sound effect, as perceived by the ears of the passenger, has been processed according to such acoustic characteristics, linearity is lost and certain types of sound effect interruptions tend to occur. Accordingly, performance in conventional sound effect producing apparatuses has been somewhat unattractive.

Based on such problems, a sound field adjusting process (flattening process) is used in order to generate linearity in the acoustic characteristics. The sound field adjusting process is performed as follows by the sound field adjuster 51.

Figure 4A:
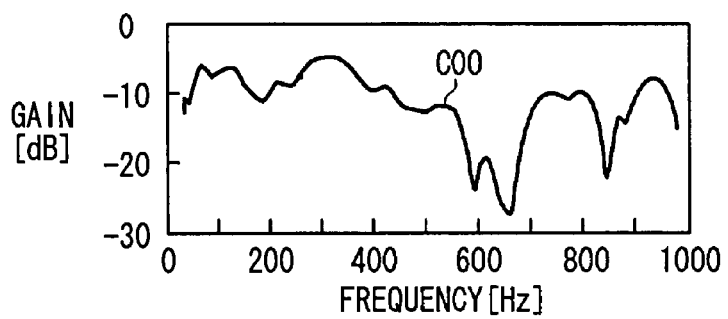
FIG. 4A is a diagram showing a measured gain characteristic curve.
Figure 4B:
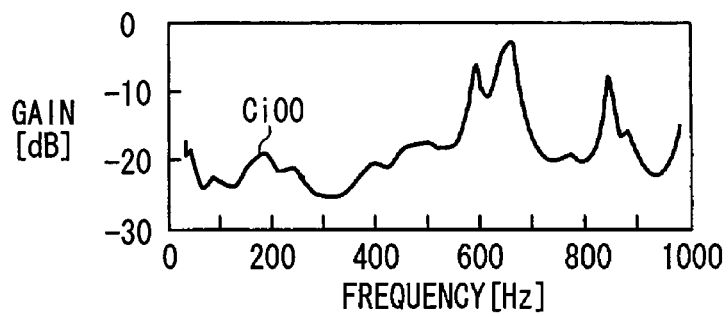
FIG. 4B is a diagram showing a gain characteristic curve, which is an inversion of the measured gain characteristic curve.

The sound field adjuster 51 functions as a filter having gain characteristics (wherein a horizontal axis represents frequency and a vertical axis represents gain), which are represented by the gain characteristic curve (inverted gain characteristic curve) Ci00 shown in FIG. 4B, and in particular, wherein the gain characteristic curve Ci00 is an inversion of the gain characteristic curve C00 shown in FIG. 4A, and changes depending on the frequency of the reference signal Sr emitted from the speaker 14 toward the front seat passenger position 29.

The inverted gain characteristic curve Ci00 has increased gain levels at frequencies where acoustically less transmissive dips are present in the gain characteristic curve C00 shown in FIG. 4A, and having reduced gain levels at frequencies where acoustically more transmissive peaks are present in the gain characteristic curve C00 shown in FIG. 4A. The inverted gain characteristic curve Ci00 is expressed by an equation (transfer function) as Ci00=B/C00 where B represents a reference value.

Figure 4C:
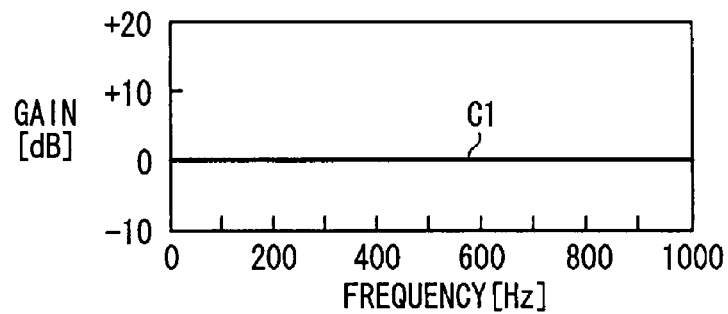
FIG. 4C is a diagram showing a corrected gain characteristic curve.

If the gain of the sound pressure adjuster 70 is 1, i.e., 0 [dB] in the sound effect producing apparatus 101, when the reference signal generator 18 generates a reference signal Sr having a constant amplitude within a frequency range from 30 [Hz] to 970 [Hz], the corrective gain characteristic curve Ci00 of the sound field adjuster 51 and the sound-field gain characteristic curve C00 are multiplied at the front seat passenger position 29, thereby producing gain characteristics C1 according to which sounds having a flat sound pressure level within the frequency range are heard at the front seat passenger position 29, as indicated by the gain characteristic curve C1 shown in FIG. 4C.

Therefore, when the cyclic period of the engine pulses Ep changes or remains constant while the driver either accelerates or decelerates the motor vehicle, or keeps the motor vehicle running at a constant speed, the reference signal generator 18 generates a sine-wave reference signal Sr whose frequency increases, decreases, or remains constant substantially in real time, depending on the harmonic signal Sh having an nth-harmonic frequency fe (e.g., 6th harmonic frequency 6 fe) produced by the multiplier 26 from the engine rotational frequency fe that is detected by the frequency detector 23.

Figure 3:
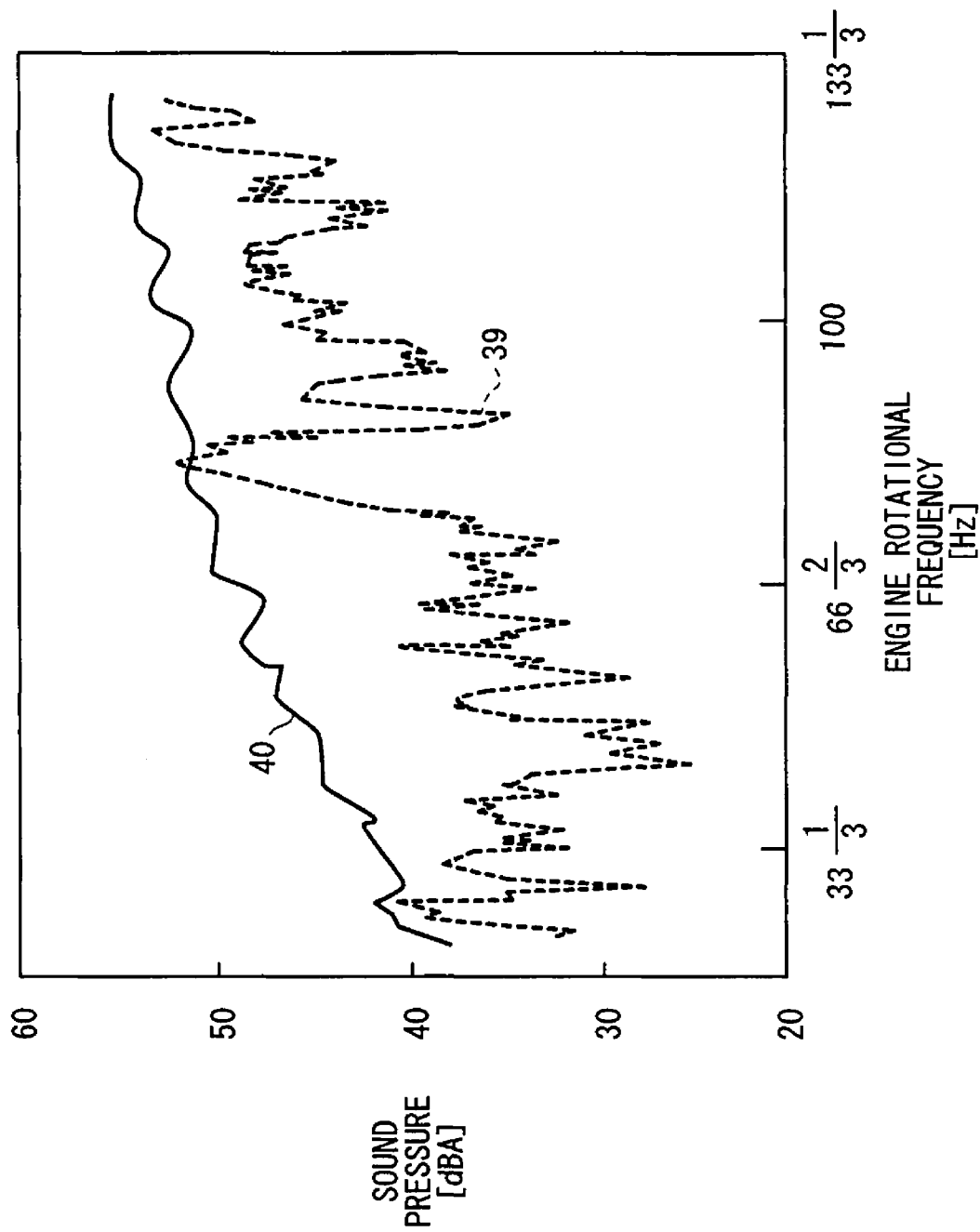
FIG. 3 is a diagram showing frequency characteristics of sound pressure levels, before and after they are corrected.

Similarly to the gain characteristic curve 40 in FIG. 3, the reference signal Sr is converted by the processor 201 into a control signal Sc1, which has been corrected by the gain characteristic curve Ci00 of the sound field adjuster 51. Consequently, if the gain of the sound pressure adjuster 70 is 0 [dB], or is flat relative to the frequency change, the sound effect output from the speaker 14 is prevented from changing, depending on the frequency at the front seat passenger position 29, due to the vehicle cabin acoustic characteristics C00. Therefore, flat gain vs. frequency characteristics are provided at the front seat passenger position 29. The sound effect generated at the front seat passenger position 29 is thus made linear depending on the engine rotational frequency fe (n times as the engine rotational frequency fe in the present embodiment), or stated otherwise, depending on the state of the noise source.

In achieving the gain characteristic curve 40 shown in FIG. 3, to make the sound effect more linear, the reference signal Sr or the control signal Sc1 is generated such that its amplitude increases in proportion to the engine rotational frequency fe.

As shown in FIG. 3, the corrected gain characteristic curve 40 has a sound pressure level [dbA] that changes more linearly, depending on the engine rotational frequency fe, than the uncorrected gain characteristic curve 39, which has dips and peaks therein.

As described above, the sound field adjusting process (flattening process) serves as a process for generating, at the front seat passenger position 29, a sound effect that changes linearly as the engine rotational frequency fe increases or while the motor vehicle is accelerated.

(2) Frequency Emphasizing Process

The frequency emphasizing process acts as a process for adjusting the amplitude (or gain) of the reference signal Sr within a certain frequency range. Stated otherwise, the frequency emphasizing process performs the functions of an equalizer. The frequency emphasizing process is carried out as follows.

Figure 4D:
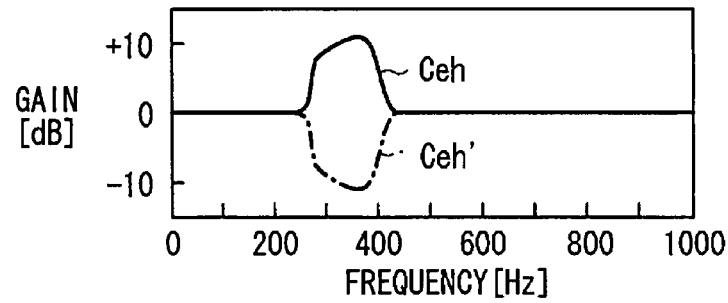
FIG. 4D is a diagram showing a gain characteristic curve having enhanced gains within a certain frequency range.
Figure 4E:
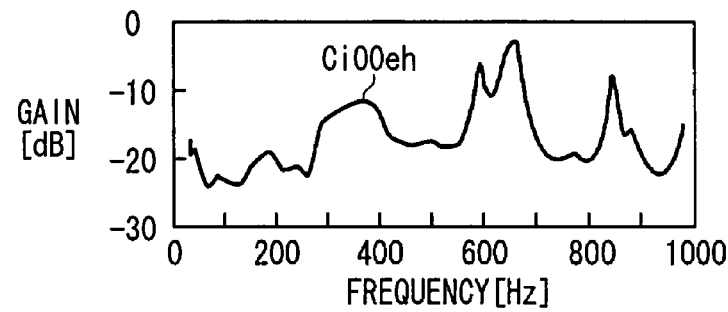
FIG. 4E is a diagram showing the inverted gain characteristic curve having enhanced gains within a certain frequency range.

For example, as indicated by the solid-line curve in FIG. 4D, when performing the sound field adjusting process, the sound field adjuster 51 provides gain characteristics represented by the gain characteristic curve Ceh, having increased gains in a frequency range from 300 [Hz] to 450 [Hz], for example. Therefore, as shown in FIG. 4E, the sound field adjuster 51 provides a joint gain characteristic curve Ci00eh. The joint gain characteristic curve Ci00eh shown in FIG. 4E has higher gains, i.e., produces higher sound pressure levels within the frequency range from 300 [Hz] to 450 [Hz], than the inverted gain characteristic curve Ci00 shown in FIG. 4B.

As indicated by the dotted line in FIG. 4D, the sound field adjuster 51 may also provide a gain characteristic curve Ceh' at the front seat passenger position 29, for thereby reducing gains or lowering sound pressure levels within the above frequency range. If a plurality of multipliers 26 have been provided as described above, the frequency emphasizing process should be performed for each of the outputs from the respective multipliers 26.

(3) Degree-Specific Adjusting Process

The degree-specific adjusting process is a process for adjusting the gain for each reference signal Sr depending on the degree of the corresponding harmonic signal. The degree-specific adjusting process is useful for an arrangement in which a plurality of multipliers 26 are provided, which generate a plurality of reference signals Sr. For example, the gain for each reference signal Sr is adjusted depending on the engine rotational frequency fe.

According to the degree-specific adjusting process, since each reference signal Sr is corrected depending on degree, it is possible to produce a sound effect having a deep tone color to be staged at the ears of a passenger present in the passenger position 29, thereby providing greater attractiveness.

(4) Sound Pressure Adjusting Process

The sound pressure adjusting process changes the gain for the control signal Sc1 in order to adjust a sound pressure level of a sound effect that is output from the speaker 14. The sound pressure adjusting process of the present embodiment includes: a first sound pressure adjusting process performed depending on the change $\Delta af$ [Hz/sec] of the engine rotational frequency fe per unit of time; a second sound pressure adjusting process performed depending on an engagement state of the clutch; and a third sound pressure adjusting process performed depending on a declutching time when the clutch is not engaged, and the frequency change $\Delta af$.

(a) Sound Pressure Adjusting Process Based on Change $\Delta af$ of Engine Rotational Frequency fe per Unit of Time (First Sound Pressure Adjusting Process)

Figure 5A:
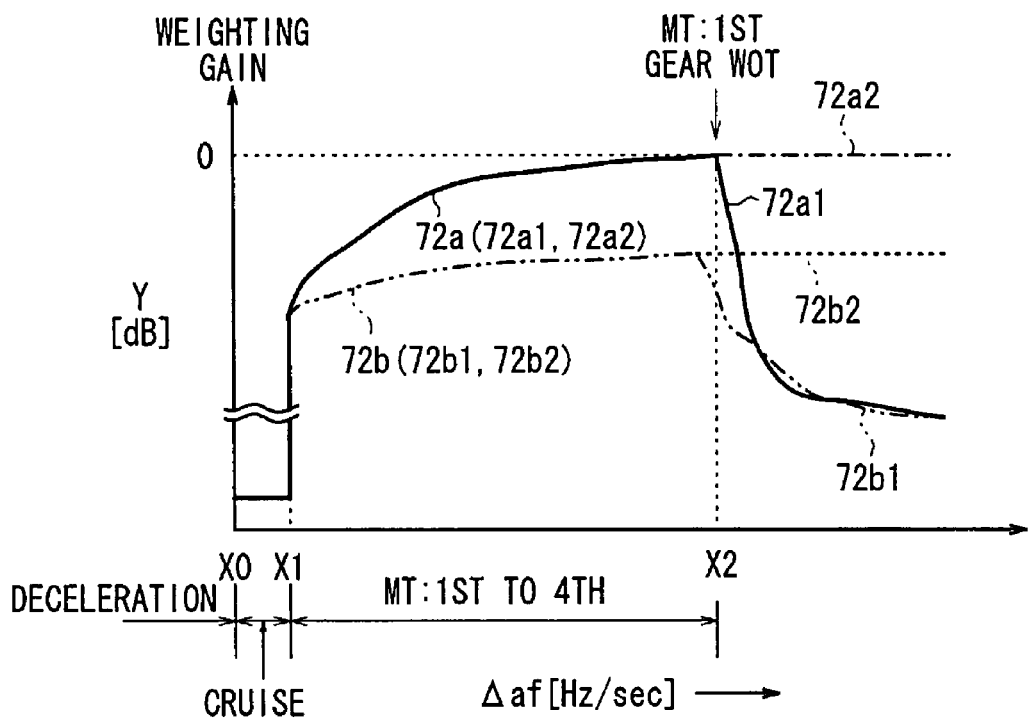
FIGS. 5A and 5B are diagrams each showing a weighting gain characteristic curve depending on an engagement state of a clutch.

As indicated by gain characteristics 72a shown in FIG. 5A, according to the first sound pressure adjusting process, a gain Y for the control signal Sc1 is varied depending on the change $\Delta af$ of the engine rotational frequency fe per unit of time.

The frequency change $\Delta af$ is calculated in the ECU 121 by the frequency change detector 68. The frequency change detector 68 determines the difference $\Delta f$ ($\Delta f = f2 - f1$) between frequencies of two successive engine pulses Ep (FIG. 6), i.e., the frequency f1 of a preceding pulse (preceding frequency) and the frequency f2 of a following pulse (present frequency), which are successively detected by the frequency detector 23.

The frequency change detector 68 then multiplies the difference $\Delta f$ by the present frequency f2 in order to determine a change $\Delta af$ [Hz/sec] ($\Delta af = \Delta f \times f2$) of the engine rotational frequency fe per unit of time, i.e., so as to determine an acceleration value.

As shown in FIG. 7, it is known in the art that the frequency change $\Delta af$ has a different value depending on the gear position of the motor vehicle transmission. Specifically, the frequency change $\Delta af$ is greater when the transmission is in a lower gear position, and is smaller when the transmission is in a higher gear position.

Generally, the sound level of the sound effect, which depends on the frequency change $\Delta af$, should preferably be greater in a lower gear position than in a higher gear position. The sound level of the sound effect should preferably be lower when the motor vehicle cruises at a constant speed or is decelerated. Further, when the engine on the motor vehicle is raced, or when the motor vehicle transmission has a throttle kickdown, whose frequency change $\Delta af$ exceeds the frequency change $\Delta af$ corresponding to a wide open throttle (WOT) for the first gear, it is preferable to decrease the sound effect to avoid undesirable sound effects.

FIG. 5A shows weighting gain characteristics 72a, 72b that are set in the sound pressure adjuster 70 in view of the above considerations.

The gain characteristics 72a are for a normal mode (clutching mode). The normal mode is a mode in which the clutch (not shown) is engaged. The gain characteristics 72b are for a shift-change mode (declutching mode). The shift-change mode is a mode in which the clutch is disengaged. Details of the gain characteristics 72b shall be described later.

The gain characteristics 72a (FIG. 5A) for the normal mode have a maximum value (e.g., 0 [dB]) of the weighting gain Y for the frequency change X2 (FIG. 7) for wide open throttle of the first gear. When the frequency change $\Delta af$ decreases from the frequency change X2 to the frequency change X1 (FIG. 7) for wide open throttle of the fourth gear, the weighting gain Y gradually becomes smaller. Stated otherwise, a larger sound effect is produced during acceleration at low gear, while a smaller sound effect is produced during acceleration at high gear. Further, the weighting gain Y has a minimum value (e.g., -15 [dB]) when the change $\Delta af$ of the engine rotational frequency fe per unit of time is around zero or less, such as during cruise driving or deceleration. Furthermore, when the frequency change $\Delta af$ during declutching or kickdown exceeds the frequency change X2 for wide open throttle of the first gear, two weighting gain characteristics 72a1, 72a2 can be selected. According to the weighting gain characteristics 72a1, the weighting gain Y decreases steeply so as to avoid an undesirable larger sound effect. According to the weighting gain characteristics 72a2, the weighing gain Y has no such decrease. The weighing gain characteristics 72a1 is usually selected.

(b) Sound Pressure Adjusting Process Based on Engagement State of Clutch (Second Sound Pressure Adjusting Process)

Figure 8:
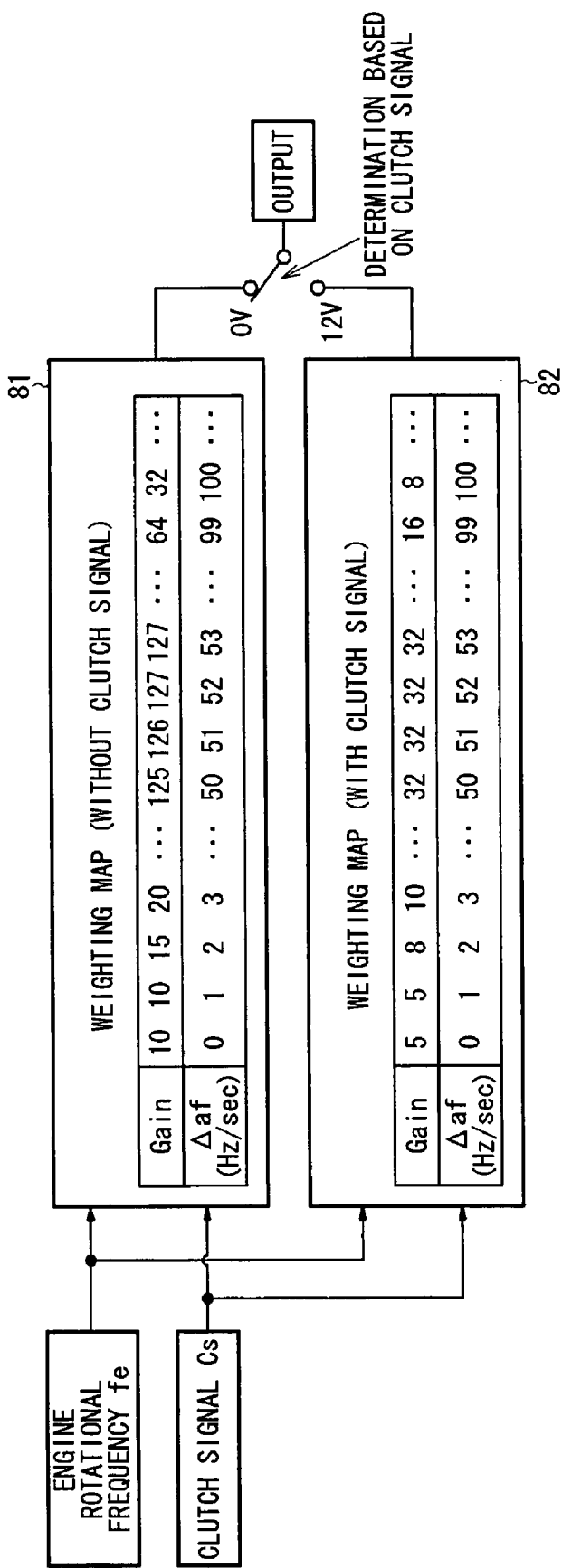
FIG. 8 is a diagram simply showing a switching method between two weighting gain tables, depending on the engagement state of the clutch.

In the second sound pressure adjusting process, the gain for the control signal Sc1 is varied depending on the engagement state of the clutch. Specifically, the gain characteristics 72a for the normal mode and the gain characteristics 72b for the shift-change mode in FIG. 5A are switched depending on the engagement state of the clutch. As shown in FIG. 8, switching between the gain characteristics 72a and 72b is performed based on the clutch signal Cs.

As shown in FIG. 5A, the gain characteristics waveform 72b for the shift-change mode is similar to that of the gain characteristics 72a. However, the gain characteristics 72a and 72b differ from each other in that the gain range of the gain characteristics 72b is narrower than that of the gain characteristics 72a. For example, according to the gain characteristics 72b, the gain Y with the frequency change X2 for wide open throttle of the first gear, as the maximum value of the weighting gain Y, is set to −5 [dB]. The weighting gain Y, when the change Δaf of the engine rotational frequency fe per unit of time is around zero or less, is set to −15 [dB].

The data of the gain characteristics is written beforehand into a memory (not shown), such as an EEPROM.

Next, details of the method for switching between the gain characteristics 72a and 72b, depending on the engagement state of the clutch, shall be described below.

The sound pressure adjuster 70 in the processor 201 determines an engagement state of the clutch based on presence of the clutch signal Cs from the clutch switch 122. As shown in FIG. 1, the clutch signal Cs is generated by the clutch switch 122, which is connected to the clutch pedal 120.

Figure 9:
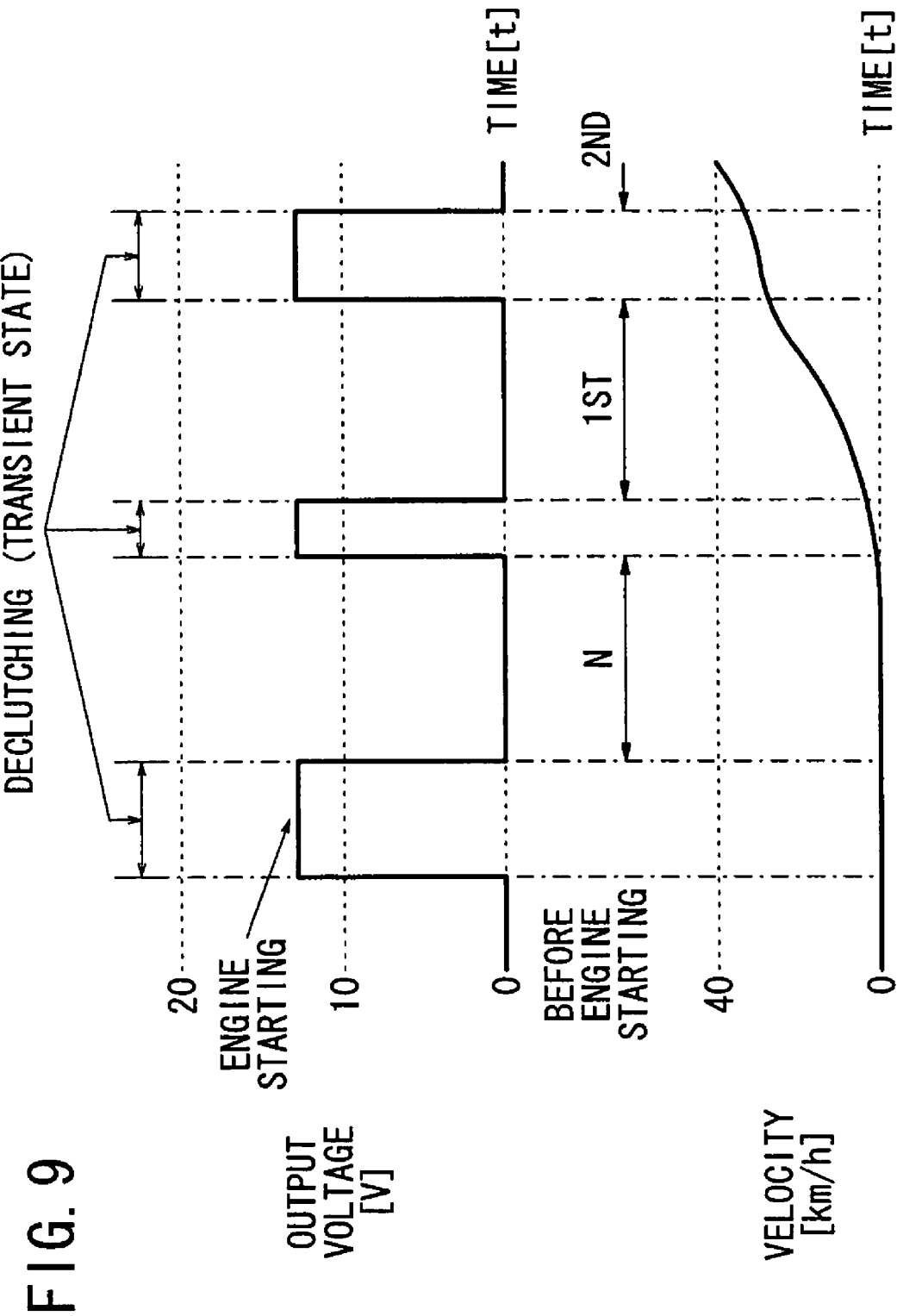
FIG. 9 is a diagram showing an output of clutch signals, indicating the engagement state of the clutch and the corresponding vehicle velocity.

The clutch switch 122 comprises a normally closed switch, in which one of the fixed terminals thereof is grounded, and the other is connected to a +12[V] power source via a resistor 124. Therefore, as shown in FIG. 9, while the driver presses the clutch pedal 120 (i.e., when the clutch is disengaged), the switchable terminal of the switch is shifted from a close state to an open state. When placed in the open state, the clutch signal Cs having +12[V] is transmitted to the sound pressure adjuster 70 of the processor 201. Accordingly, the processor 201 determines a declutching condition when the clutch signal Cs of +12 [V] is received.

It should be noted that, strictly speaking, even when the driver presses the clutch pedal 120, due to the tolerance of the clutch pedal 120, the clutch actually is not disengaged if at least part or all of the driving force from the engine is transmitted to the driven wheels. However, since the duration of the above downshift operation is quite short, there is little influence thereof on the features of the present invention, in which the gain for the sound effect is lowered during the shift-change. Therefore, the above conditional can be included within the declutching state. Alternatively, it is possible to determine the above condition and to adjust the gain accordingly, as shall be described later.

Figure 10:
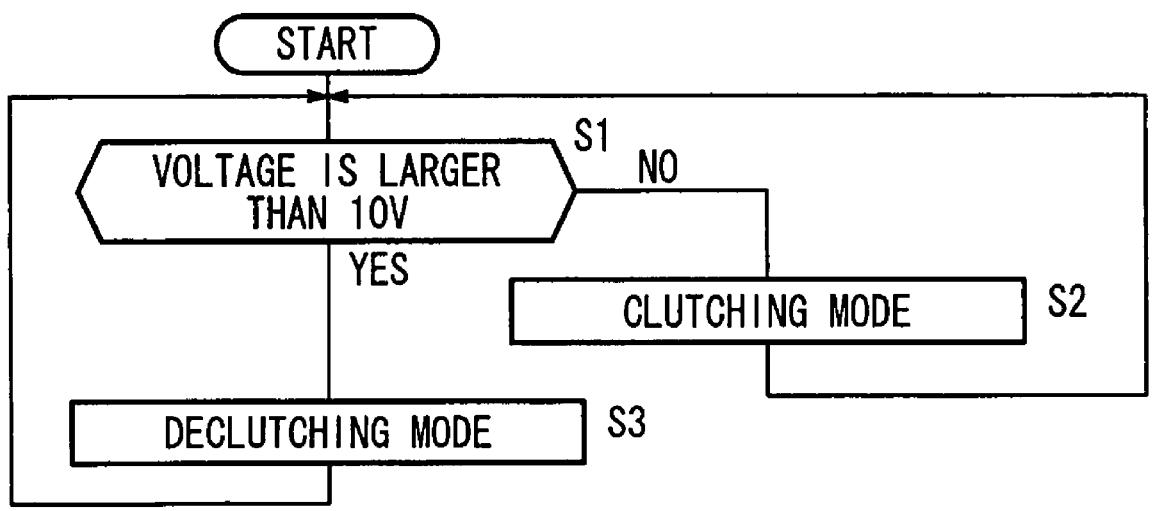
FIG. 10 is a flowchart for determining an engagement state of the clutch.

FIG. 10 shows a flowchart in which the sound pressure adjuster 70 of the processor 201 determines the engagement state of the clutch.

In step S1, when a battery (not shown) is connected to the ECU 121, the sound pressure adjuster 70 determines the presence of the clutch signal Cs, i.e., whether the output voltage from the clutch switch 122 exceeds a threshold of 10 [V]. If the output voltage from the clutch switch 122 is 10 [V] or less, the sound pressure adjuster 70 changes to the normal mode (clutching mode), and performs the first sound pressure adjusting process using the gain characteristics 72a of FIG. 5A in step S2. After step S2, the sound pressure adjuster 70 returns to step S1. If the output voltage from the clutch switch 122 exceeds 10 [V] in step S1, the sound pressure adjuster 70 changes to the shift-change mode (declutching mode), and performs the first sound pressure adjusting process using the gain characteristics 72b of FIG. 5A in step S3. After step S3, the sound pressure adjuster 70 returns to step S1. Steps S1 to S3 are repeated until the vehicle engine is stopped.

Figure 5B:
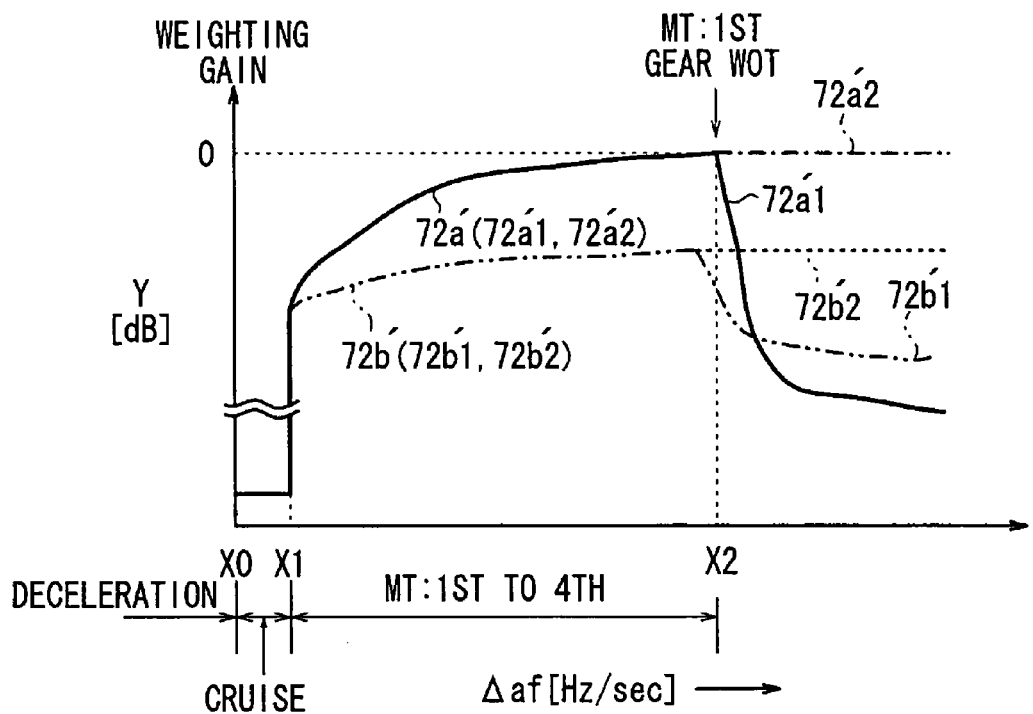

The gain characteristics 72a', 72b' in FIG. 5B are similar to the gain characteristics 72a, 72b. However, the gain Y of the gain characteristics 72b', when the change Δaf of the engine rotational frequency fe per unit of time exceeds the frequency change Δaf for wide open throttle of the first gear, is larger than the gain Y of the gain characteristics 72a'. Therefore, when the driver intentionally increases the engine rotational frequency fe during declutching, it is possible to avoid a rapid decrease of the gain Y and prevent producing too small of a sound effect.

Figure 11A:
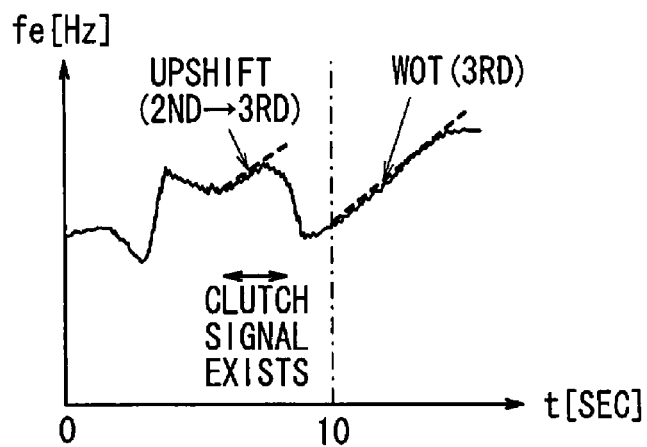
FIG. 11A is a diagram showing an engine rotational frequency when a shift position of a transmission is shifted from second gear to third gear.
Figure 11B:
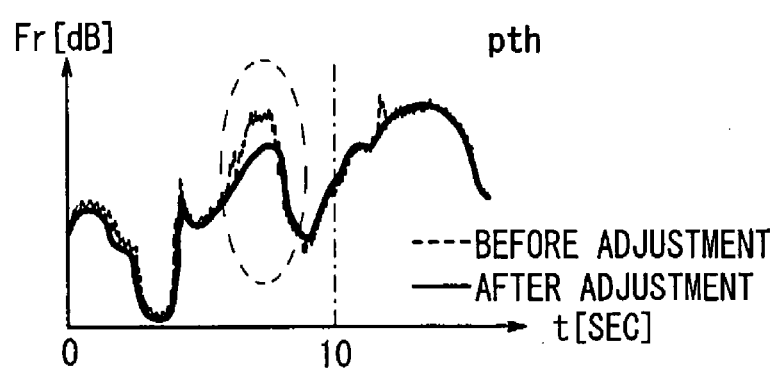
FIGS. 11B to 11D are diagrams showing sound pressure levels of outputs Fr from a speaker with and without using a sound effect producing apparatus, according to an embodiment of the present invention.
Figure 11C:
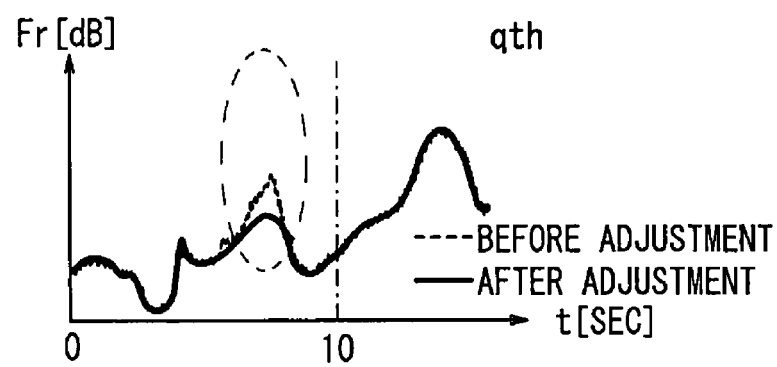
Figure 11D:
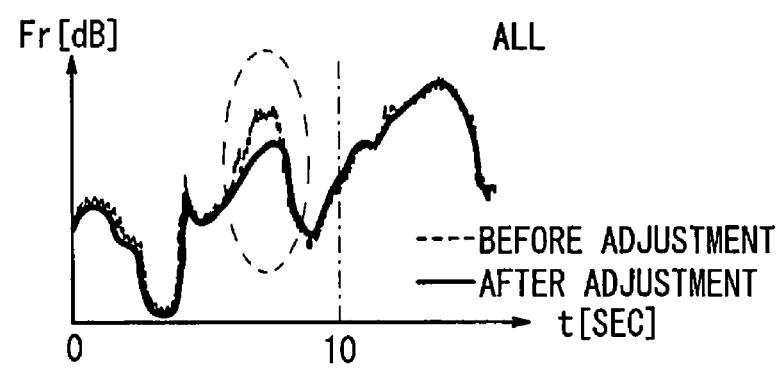

FIG. 11A shows data having a horizontal axis representing time t [sec] and a vertical axis representing the engine rotational frequency fe when a shift position of the transmission is shifted from second gear to third gear. FIG. 11B (before and after adjustment to a pth high frequency), FIG. 11C (before and after adjustment to a qth high frequency) and FIG. 11D (before and after adjustment to the whole frequencies) show data curves of sound pressures [dB] of outputs Fr from a speaker depending on the engine rotational frequency fe shown in FIG. 11A. One case thereof is where a vehicle sound effect producing apparatus according to the embodiment of the present invention is used, as indicated by the solid line, and the other case is where the sound effect producing apparatus is not used, as indicated by the broken line.

As shown in FIGS. 11A to 11D, while the clutch signal Cs is output, sound pressures of outputs Fr from the speaker in the case of using the sound effect producing apparatus are lower than those in the case when the sound effect producing apparatus is not used. Therefore, it will be understood that according to the present invention, the gap between actual acceleration of the vehicle and the sound effect output from the speaker can be decreased, thereby reducing the possibility for the driver or a passenger to feel a sense of strangeness relative to the sound effect.

(c) Sound Pressure Adjusting Process Based on Declutching Time and Change of Engine Rotational Frequency per Unit of Time (Third Sound Pressure Adjusting Process)

According to the third sound pressure adjusting process, the gain of the control signal Sc1 is varied depending on a declutching time t when the clutch is disengaged, and the change Δaf of the engine rotational frequency per unit of time. The third sound pressure adjusting process is used for the above-mentioned "heel-and-toe" operation.

The third sound pressure adjusting process according to the present embodiment shall be described below with reference to FIG. 12.

In step S11, the sound pressure adjuster 70 of the processor 201 determines the presence of the clutch signal Cs from the clutch switch 122. If no clutch signal Cs is detected, a clutch counter (not shown) provided in the processor 201 is reset in step S12, and the gain Y is maintained without any change in step S13. The gain Y is decided based on the normal gain table 81 shown in FIG. 8.

On the other hand, if the clutch signal Cs is detected in step S11, the sound pressure adjuster 70 determines whether the continuous input period of the clutch signal Cs, i.e., the declutching time t, is shorter than a predetermined time A (e.g., 2 seconds) in step S14.

If the declutching time t is the predetermined time A or longer, the sound pressure adjuster 70 determines that the operation is not a heel-and-toe operation, and multiplies the gain Y by a predetermined parameter C (0<C<1) (e.g., C=0.5) and applies the multiplied gain Y to the control signal Sc1 in step S15.

If the declutching time t is shorter than the predetermined time A, the clutch counter is set to +1 in step S16. Then, in step S17, the sound pressure adjuster 70 determines whether the change Δaf in the engine rotational frequency fe per unit of time exceeds a predetermined value B (e.g., B=1800 rpm/sec).

If the frequency change Δaf is the predetermined value B or less, the sound pressure adjuster 70 determines the operation is not a heel-and-toe operation, and multiplies the gain Y by the predetermined parameter C (e.g., C=0.5) and applies the multiplied gain Y to the control signal Sc1.

If the frequency change Δaf exceeds the predetermined value B, the sound pressure adjuster 70 determines that the operation is a heel-and-toe operation, and multiplies the gain Y by a predetermined parameter D (0<C<D) (e.g., D=0.9) and applies the multiplied gain Y to the control signal Sc1.

Once the gain Y for the control signal Sc1 has been set in steps S13, S15 or S18, the sound pressure adjuster 70 returns to step S11. The steps S11 to S18 are repeated until the engine is stopped.

5. Advantages of the First Embodiment

As explained above, according to the first embodiment of the present invention, the sound effect producing apparatus 101 comprises the waveform data table 16 for storing waveform data in one cyclic period, the frequency detector 23 for detecting the engine rotational frequency fe, the reference signal generator 18 for generating the harmonic reference signal Sr based on the engine rotational frequency fe by successively reading the waveform data from the waveform data table 16, the processor 201 for generating the control signal Sc2 based on the reference signal Sr, the clutch switch 122 for generating the clutch signal Cs indicating an engagement state of the clutch and outputting the clutch signal Cs to the processor 201, and the speaker 14 for converting the control signal Sc2 into the sound effect and outputting the sound effect. The processor 201 changes the gain Y of the control signal Sc2, depending on the change Δaf of the engine rotational frequency fe per unit of time, such that the gain Y during declutching is lower than the gain Y during clutching.

With the above arrangement, when the clutch of the vehicle is disengaged, the gain Y of the control signal Sc2 based on the reference signal Sr is lowered. Therefore, even when the engine rotational frequency fe increases during a downshift operation, an increase in the gain Y of the control signal Sc2 is prohibited. Accordingly, a gap between actual acceleration of the vehicle and the sound effect output from the speaker 14 can be decreased, thereby reducing the possibility that the driver or a passenger in the vehicle will experience a sense of strangeness relative to the sound effect.

In the first embodiment, the engagement state of the clutch can be determined, depending on the pressed state of the clutch pedal 120 that is connected to the clutch. Accordingly, even when a sensor for detecting the engagement state of the clutch is not provided for the clutch itself, it is still possible to determine the engagement state of the clutch. Therefore, the design of the clutch and the surrounding devices, for which control thereof is generally important and complicated, does not have to be changed. Further, the engagement state of the clutch can be determined easily.

According to the first embodiment, the sound effect producing apparatus 101 comprises the frequency detector 23 for detecting the engine rotational frequency fe, the processor 201 for generating the control signal Sc2 for producing the sound effect based on the engine rotational frequency fe; the speaker 14 for converting the control signal Sc2 into the sound effect and outputting the sound effect, and the clutch switch 122 for generating the clutch signal Cs indicating the engagement state of the clutch, and outputting the clutch signal Cs to the processor 201. The processor 201 calculates the declutching time t based on the clutch signal Cs, and changes the gain Y of the control signal Cs2 when the declutching time t is within the predetermined time A [sec] and the frequency change Δaf exceeds the predetermined parameter B.

With the above arrangement, when the declutching time t is within the predetermined time A [sec] and the frequency change Δaf exceeds the predetermined value B, the processor 201 determines that a heel-and-toe operation is being performed, and hence changes the gain Y of the control signal Sc2 in order to produce the sound effect. Therefore, it is possible to produce a natural sound effect during heel-and-toe operations.

Further, since the third sound pressure adjusting process is performed based on the change Δaf in the engine rotational frequency fe per unit of time, it is possible to reliably detect heel-and-toe operations even when the velocity or acceleration of the vehicle does not change or decreases.

In the first embodiment, the processor 201 changes the gain Y of the control signal Sc2, depending on the change Δaf of the engine rotational frequency fe per unit of time, wherein the gain Y includes gain values for use during clutching and gain values for use during declutching. The gain values during declutching include a gain value when the declutching time t is within the predetermined time A [sec] and the frequency change Δaf exceeds the predetermined value B, and a gain value for other situations.

Accordingly, the gain Y can be set to at least three states, the first of which is a clutching state, the second of which is a declutching state with a heel-and-toe operation, and the third of which is the declutching state without a heel-and-toe operation. Therefore, a more natural sound effect can be produced.

B. Second Embodiment

1. Summary of Mechanism for Producing Sound Effect (Difference Relative to First Embodiment)]

Figure 13:
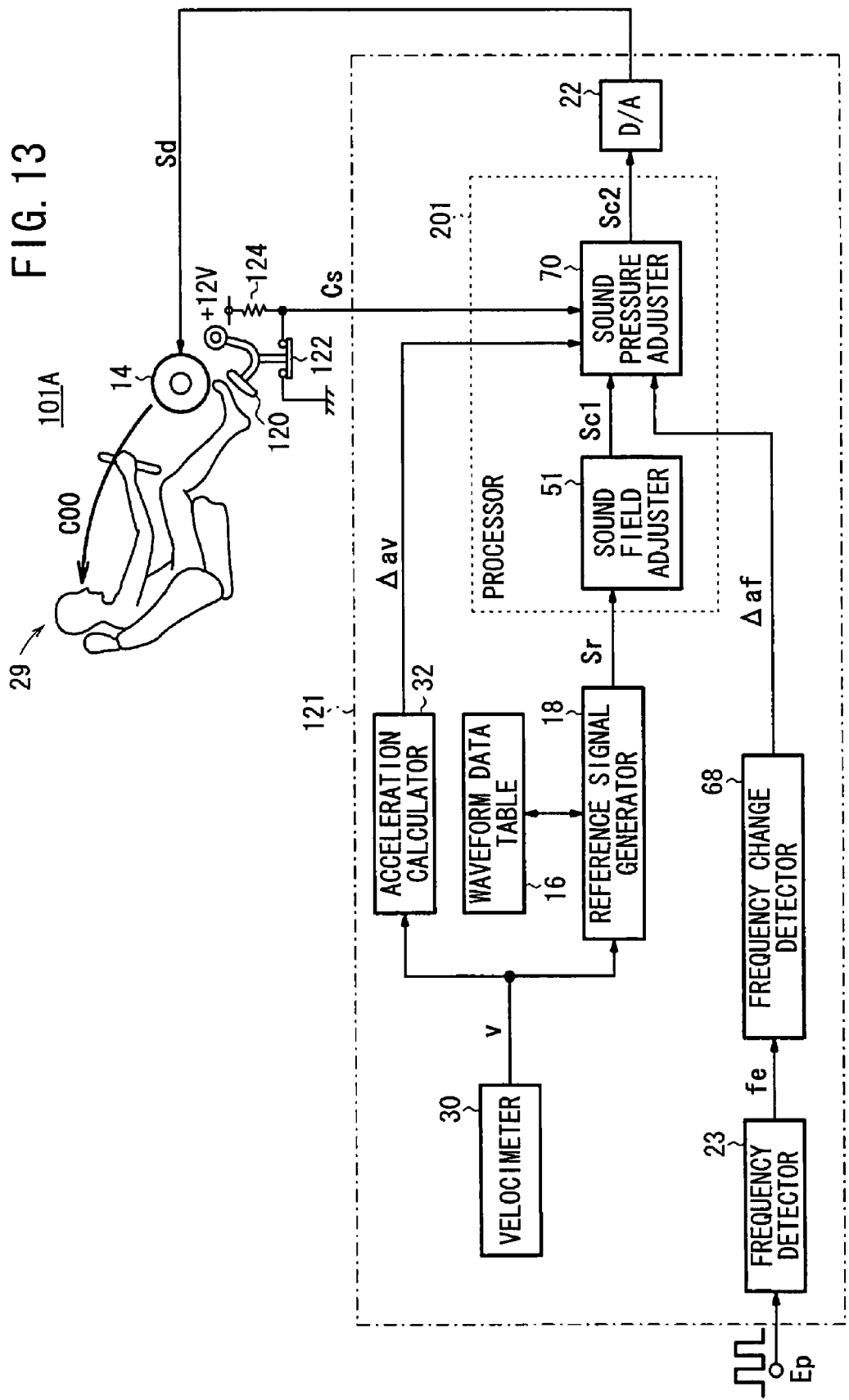
FIG. 13 is a block diagram of a sound effect producing apparatus for a vehicle according to a second embodiment of the present invention.

FIG. 13 shows a block diagram of a sound effect producing apparatus 101A for a vehicle according to a second embodiment of the present invention.

The sound effect producing apparatus 101A has an arrangement similar to that of the sound effect producing apparatus 101 shown in FIG. 1. However, the apparatus 101A also includes a velocimeter 30 for detecting a velocity v [m/s] of the vehicle, along with an acceleration calculator 32 for calculating vehicle acceleration Δav [m/s²] based on the velocity v. Further, the apparatus 101A does not include the multiplier 26. The velocity v detected by the velocimeter 30 is output to the reference signal generator 18 and to the acceleration calculator 32. The acceleration Δav calculated by the acceleration calculator 32 is output to the sound pressure adjuster 70 of the processor 201. The engine rotational frequency fe from the frequency detector 23 is output only to the frequency change detector 68.

The waveform data table 16 stores waveform data corresponding to the velocity v. Accordingly, the reference signal generator 18 generates the reference signal Sr depending on the waveform data corresponding to the velocity v, and outputs the reference signal Sr to the processor 201. In the second embodiment, the sound field adjusting process, the frequency emphasizing process and the degree-specific adjusting process by the sound field adjuster 51, as well as the second and third sound pressure adjusting processes by the sound pressure adjuster 70, are performed similarly to the first embodiment.

Figure 14:
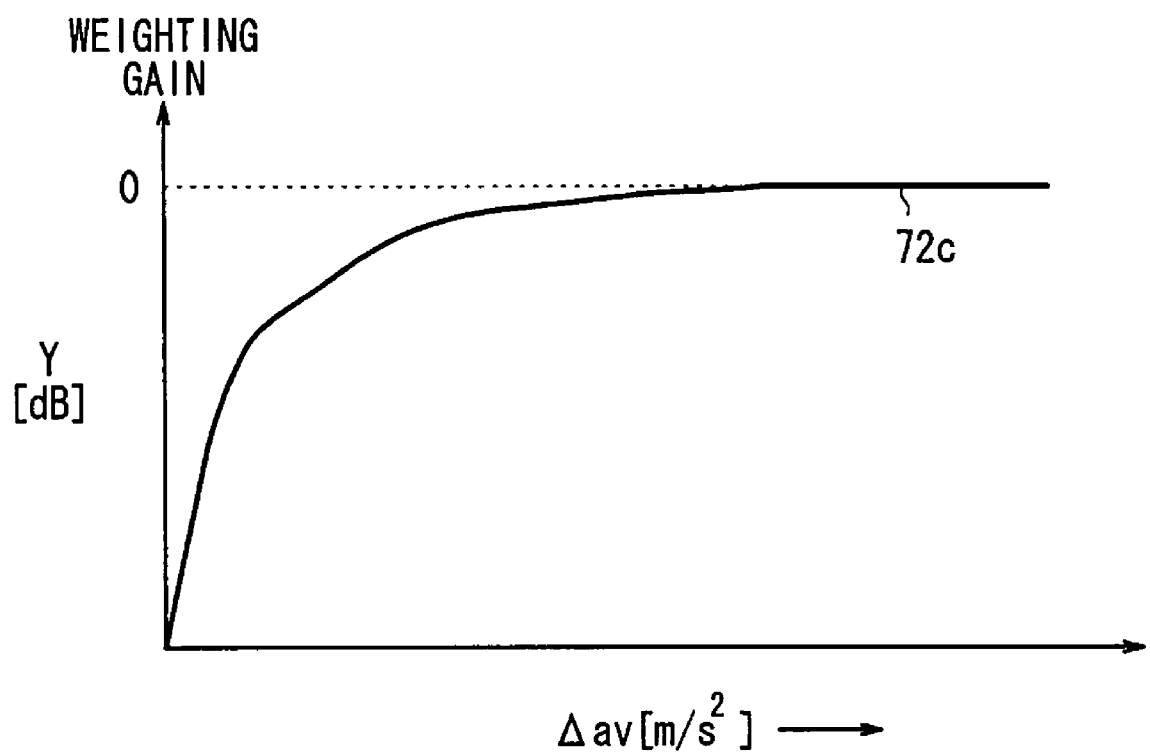
FIG. 14 is a block diagram showing weighting gain characteristics depending on acceleration of the vehicle.

On the other hand, the first sound pressure adjusting process, performed by the sound pressure adjuster 70, is performed based on the acceleration Δav of the vehicle, and is not based on the change Δaf in engine rotational frequency fe per unit of time (see FIG. 14).

In the second embodiment, since the gain Y is adjusted depending on acceleration Δav, i.e., change in velocity v per unit of time, the gap between the engine rotational frequency fe and actual acceleration of the vehicle does not present a problem, which is different from the first embodiment. Considering this point, in the second embodiment, the second sound pressure adjusting process (based on the engagement state of the clutch) need not be performed. In such a case, the third sound pressure adjusting process may be carried out based on the flowchart shown in FIG. 15, rather than the flowchart of FIG. 12.

Figure 12:
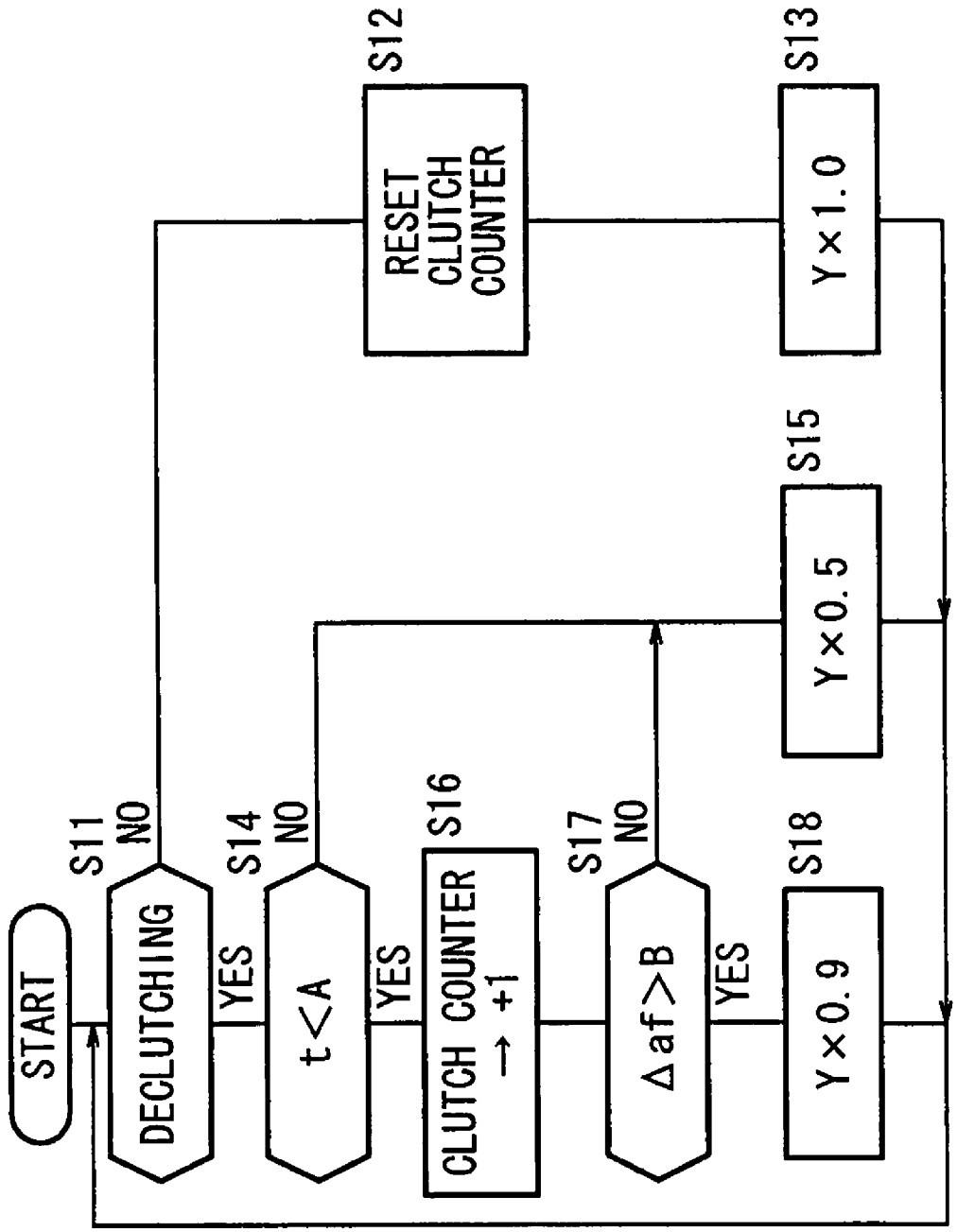
FIG. 12 is a first flowchart for determining gain values based on a declutching time and a change in the engine rotational frequency per unit of time.
Figure 15:
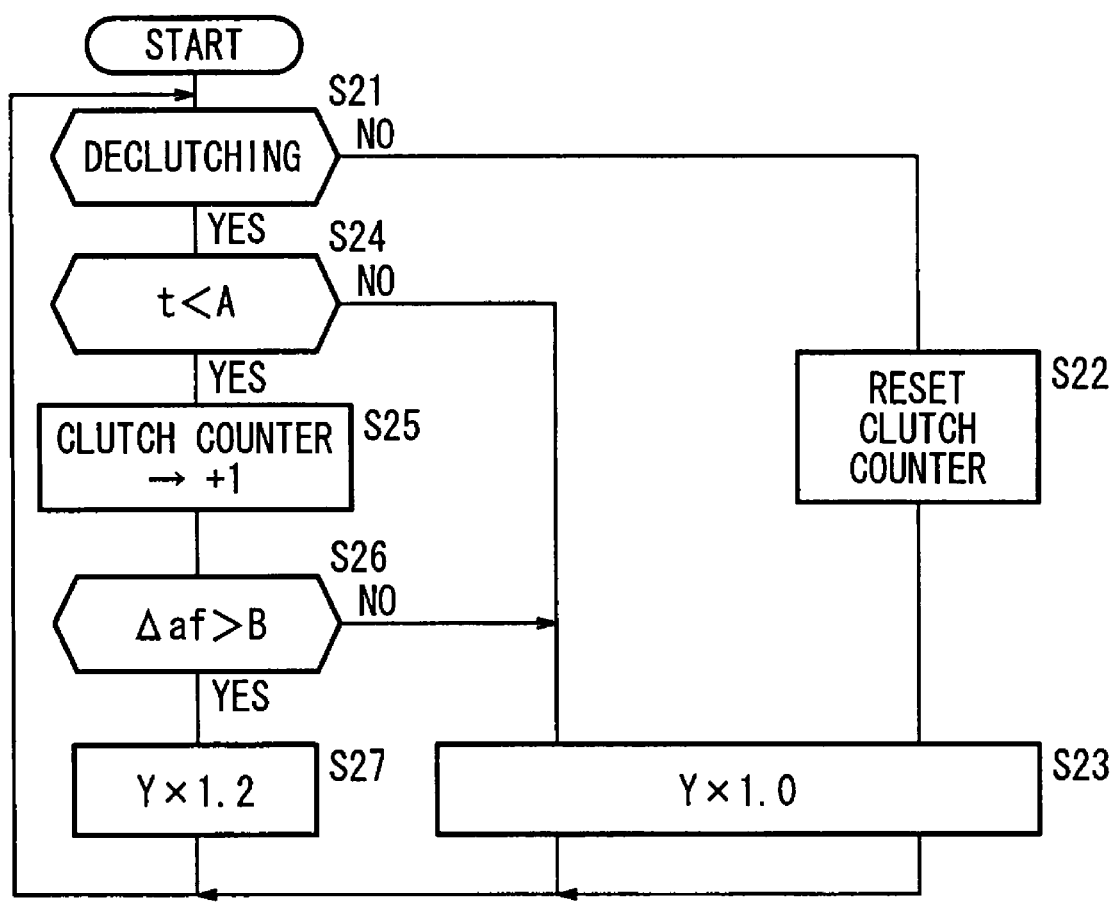
FIG. 15 is a second flowchart for determining gain values based on a declutching time and a change in the engine rotational frequency per unit of time.

Specifically, although the flowchart of FIG. 15 is basically similar to the flowchart of FIG. 12, since the flowchart of FIG. 15 lacks the second sound pressure adjusting process, the flowchart of FIG. 15 has no step corresponding to step S15 of FIG. 12.

In step S27, when a heel-and-toe operation is detected, a parameter D' for multiplying the gain Y is larger than 1 (D'=1.2 in FIG. 15). This is because no second sound pressure adjusting process is performed in the second embodiment. Stated otherwise, the sound effect applied during heel-and-toe operations is larger than the usual sound effect.

2. Advantages of the Second Embodiment

As explained above, according to the second embodiment, the sound effect producing apparatus 101A comprises the velocimeter 30 for detecting the velocity v of the vehicle, the processor 201 for generating the control signal Sc2 for producing the sound effect based on the velocity v, the speaker 14 for converting the control signal Sc2 into the sound effect and outputting the sound effect, and the clutch switch 122 for generating the clutch signal Cs indicating the engagement state of the clutch and outputting the clutch signal Cs to the processor 201. The processor 201 calculates the declutching time t based on the clutch signal Cs and changes the gain Y of the control signal Sc2 when the declutching time t falls within the predetermined time A [sec] and the change Δaf of the engine rotational frequency fe per unit of time exceeds the predetermined value B.

With the above arrangement, when the declutching time t is within the predetermined time A [sec] and the frequency change Δaf exceeds the predetermined value B, the processor 201 can determine that a heel-and-toe operation is being performed and thus change the gain Y of the control signal Sc2 for producing the sound effect. Therefore, it is possible to produce a natural sound effect during heel-and-toe operations.

Further, since the third sound pressure adjusting process is performed based on the change Δaf of the engine rotational frequency fe per unit of time, it is possible to reliably detect heel-and-toe operations even when the velocity or acceleration of the vehicle does not change or decreases.

In the second embodiment, the clutch signal Cs is generated, depending on the pressed state of the clutch pedal 120 that is connected to the clutch. Accordingly, even when no sensor is provided with the clutch itself for detecting the engagement state of the clutch, it is still possible to determine the engagement state of the clutch. Therefore, design changes of the clutch and the surrounding devices, for which the control thereof is generally important and complicated, are not required. Thus, the engagement state of the clutch can be determined easily.

In the second embodiment, the processor 201 changes the gain Y of the control signal Sc2 depending on the acceleration Δav, such that values of the gain Y when the declutching time t is within the predetermined time A [sec] and the change Δaf in engine rotational frequency fe per unit of time exceeds the predetermined value B, are larger than values of the gain Y at other times (see FIG. 15).

According to the arrangement in which the gain Y of the control signal Sc2 is changed depending on acceleration Δav, the increase in engine rotational frequency fe during declutching does not change the gain Y directly. However, with such an arrangement, when the engine rotational frequency fe increases during declutching, the gain Y can still be increased. Therefore, it is possible to produce a natural sound effect during heel-and-toe operations.

C. Variations and Modifications of the Present Invention

Although certain preferred embodiments of the present invention have been shown and described in detail above, it should be understood that various changes and modifications may be employed or envisioned based on the disclosure of the invention as set forth in the specification.

1. Determination of Engagement State of Clutch

In the above embodiments, the engagement state of the clutch is determined by the clutch switch 122 connected to the clutch pedal 120. However, the present invention is not limited to such an arrangement if the engagement state of the clutch can be determined otherwise. For example, the connecting state of the clutch can be judged by detecting a control signal associated with a clutch pressure lever that reciprocates a clutch disk relative to a flywheel on the engine side. The clutch also is not limited to a dry type single plate clutch. Any type of clutch may be used, which has no correlation during declutching between the change Δaf of the engine rotational frequency fe per unit of time and the actual acceleration of the vehicle.

In the above embodiments, the clutch switch 122 is an on/off type, representing two states including a clutching state and a declutching state. However, three or more states can be determined by varying the output of the clutch switch 122, for example, depending on the pressed in state of the clutch pedal 120. The three or more states may include a state wherein the entire driving force of the engine is transmitted to the driven wheels, a state in which a part of the driving force of the engine is transmitted to the driven wheels, and a state where no driving force from the engine is transmitted to the driven wheels. In such a case, a plurality of modes and gain tables therefor may be set depending on each state.

Even when an on/off type of clutch switch 122 is used, the engagement state of the clutch may be determined by measurements from a velocimeter that measures the velocity of the vehicle, or from an acceleration detector that measures the acceleration of the vehicle, wherein decreasing of gain of the control signal Sc2 may be adjusted in accordance with the determined result.

In the above embodiments, the clutch signal Cs is output when the clutch pedal 120 is pressed. However, the present invention is not limited to such an arrangement, if the engagement state of the clutch can otherwise be indicated. For example, the clutch signal Cs may be output when the clutch pedal 120 is not pressed, whereas the clutch signal Cs is not output when the clutch pedal 120 is pressed. Further, the voltage of the clutch signal Cs may be varied in proportion to the amount at which the clutch pedal 120 is pressed.

2. Second Sound Pressure Adjusting Process

In the first embodiment, the normal gain table 81, including gain values of the control signal Sc2 in a state in which the clutch pedal 120 is not pressed, and the shift-change gain table 82, including gain values of the control signal Sc2 in a state in which the clutch pedal 120 is pressed, are provided respectively. However, the present invention is not limited to such an arrangement, if the gain values of the control signal Sc2 during declutching are lower than the gain values of the control signal Sc2 during clutching. For example, only the normal gain table 81, including gain values of the control signal Sc2 when the clutch pedal 120 is not pressed can be provided, wherein if the clutch pedal 120 is pressed, the gain values of the control signal Sc2 in the normal gain table 81 can be multiplied by a parameter P (0<P<1).

3. Third Sound Pressure Adjusting Process

In the above embodiments, the engine rotational frequency fe (first embodiment) and the vehicle velocity v (second embodiment) are used as sound source information for producing the sound effect. However, the present invention is not limited to such cases, and other sound source information can be used for producing the sound effect. For example, a gate opening degree of the accelerator, and a gate opening degree of the throttle, can also be used for the sound source information.

Figure 16:
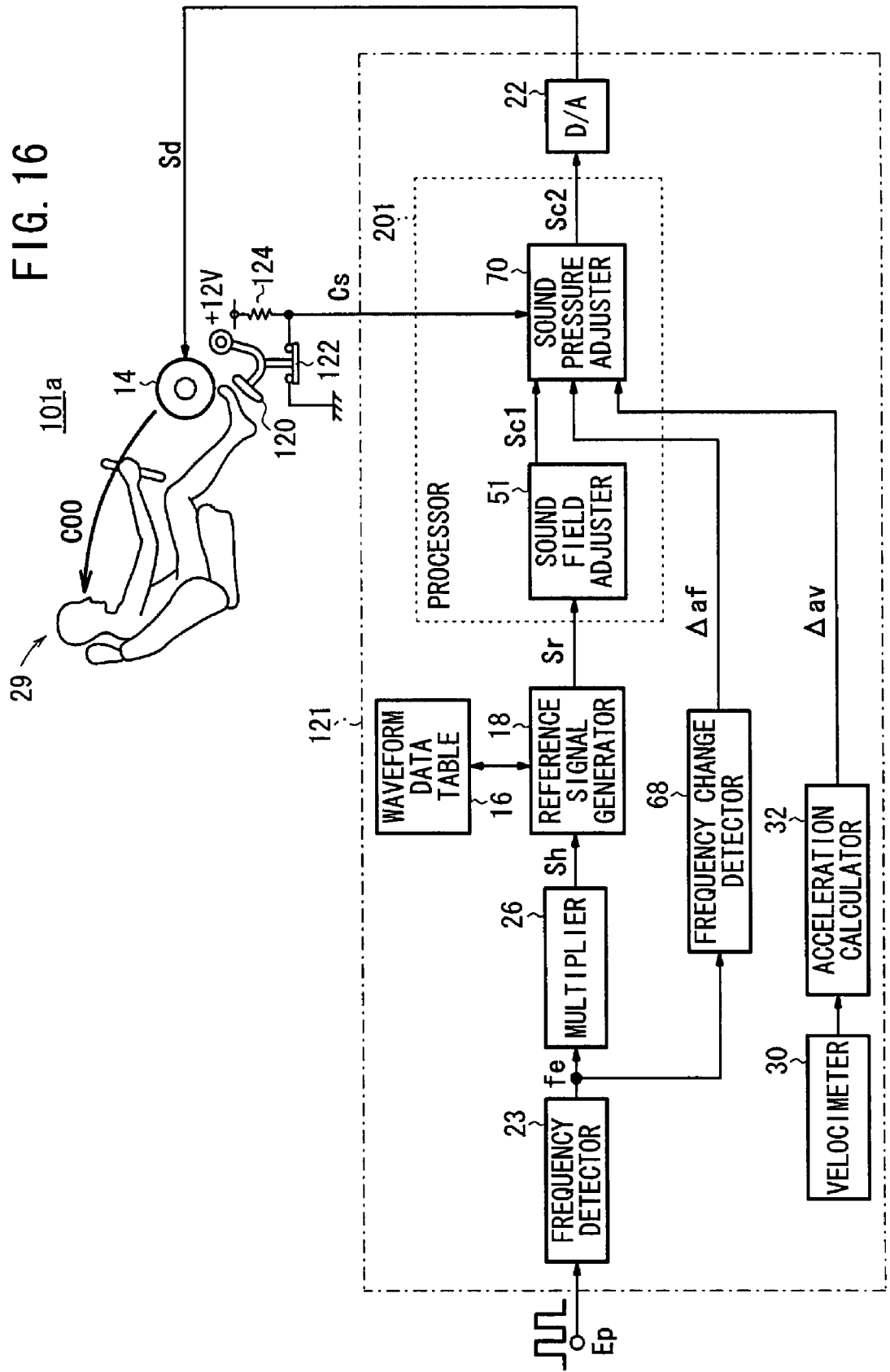
FIG. 16 is a block diagram of a modified sound effect producing apparatus for a vehicle.

In the first embodiment (FIG. 1), the engine rotational frequency fe is used for generating the harmonic signal Sh and the reference signal Sr, while the change Δaf in engine rotational frequency fe per unit of time is used for performing the first sound pressure adjusting process. In the second embodiment (FIG. 13), the velocity v is used for generating the reference signal Sr, while the acceleration Δav is used for performing the first sound pressure adjusting process. In addition to these arrangements, as in the sound effect producing apparatus 101a for the vehicle shown in FIG. 16, the engine rotational frequency fe may be used for generating the harmonic signal Sh and the reference signal Sr, while the acceleration Δav may be used for performing the first sound pressure adjusting process. In such an arrangement, the harmonic signal Sh and the reference signal Sr may be generated similarly to the first embodiment, while the first sound pressure adjusting process may be carried out similarly to the second embodiment. In the sound effect producing apparatus 101a, the acceleration Δav of the vehicle may be determined by an acceleration sensor, instead of the acceleration calculator 32.

In the above embodiments, the change Δaf of the engine rotational frequency fe per unit of time is used as the parameter for determining existence of the heel-and-toe operation. However, the present invention is not limited to this arrangement, if the parameter relates to sound source information (i.e., information about the driving state of the vehicle or engine operation information) applicable to determining the heel-and-toe operation, in combination with the declutching time t. For example, a gate opening degree of an accelerator, a gate opening degree of a throttle, and acceleration of the vehicle may be employed.

If acceleration is used as a parameter, the parameter does not increase during declutching. Therefore, if acceleration is used, the present invention can be applied only if the above clutch switch 122 is used while part or all of the driving force from the engine is transmitted to the driven wheels through the clutch.

In the first embodiment, including the normal gain table 81 having gain values of the control signal Sc2 when the clutch pedal 120 is not pressed, if the clutch pedal 120 is pressed, the gain values of the control signal Sc2 in the normal gain table 81 are multiplied by the parameter C or D (0<C<D). However, the present invention is not limited to such an arrangement, in particular, if the gain values of the control signal Sc2 during declutching are made lower than the gain values of the control signal Sc2 during clutching. For example, three gain tables may be provided, the first of which is a normal gain table including gain values of the control signal Sc2 when the clutch pedal 120 is not pressed, the second of which is an exceptional shift-change gain table including gain values of the control signal Sc2 when the clutch pedal 120 is pressed and a heel-and-toe operation is being performed, and the third of which is a general shift-change gain table including gain values of the control signal Sc2 when the clutch pedal 120 is pressed and the heel-and-toe operation is not being performed.

In the above embodiments, the third sound pressure adjusting process is performed based on the declutching time t when the clutch is disengaged, and either the change Δaf of the engine rotational frequency fe per unit of time (first embodiment) or the acceleration Δav of the vehicle (second embodiment). In addition to these factors, an operation state of a brake can be used. For example, it may be determined whether the brake is operated for a predetermined time (e.g., three seconds) just before step S11 in FIG. 12 (determination of the connecting state of the clutch). If the brake is operated for such a predetermined time (e.g., two seconds), the sound pressure adjuster 70 proceeds to step S11. If the brake is not operated for the predetermined time, the sound pressure adjuster 70 proceeds to step S12 (reset of the clutch counter). The operation state of the brake can be determined, for example, through an output of a brake switch that detects the pressed state of a brake pedal. Instead of determining the operation state of the brake, a decrease in the acceleration of the vehicle may also be determined in order to perform the third sound pressure adjusting process.

4. Other Considerations

In the above embodiments, the sound field adjuster 51 performs the sound field adjusting process, the frequency emphasizing process and the degree-specific adjusting process before the first to third sound pressure adjusting processes. However, depending on the sound field characteristics C00 at the front seat passenger position 29, the sound field adjusting process, the frequency emphasizing process and the degree-specific adjusting process may be omitted.

What is claimed is:

1. A sound effect producing apparatus for a vehicle comprising:
   a waveform data table for storing waveform data in one cyclic period;
   a frequency detector for detecting an engine rotational frequency;
   a reference signal generator for generating a harmonic reference signal based on said engine rotational frequency by successively reading said waveform data from said waveform data table;
   a processor for generating a control signal based on said reference signal;
   a clutch signal generator for generating a clutch signal indicating an engagement state of a clutch and outputting said clutch signal to said processor; and
   an output means for converting said control signal into a sound effect and outputting said sound effect,
   wherein said processor changes a gain of said control signal, depending on a change of said engine rotational frequency per unit of time, such that said gain during declutching is lower than said gain during clutching.

2. A sound effect producing apparatus according to claim 1, wherein said clutch signal generator generates said clutch signal, depending on a pressed state of a clutch pedal that is connected to said clutch.

3. A sound effect producing apparatus according to claim 2, further comprising:
   a normal gain table including gain values of said control signal when said clutch pedal is not pressed; and
   a shift-change gain table including gain values of said control signal when said clutch pedal is pressed.

4. A sound effect producing apparatus for a vehicle that produces a sound effect based on sound source information including vehicle driving state information or engine operation information, comprising:
- a sound source information detector for detecting said sound source information;
- a processor for generating a control signal for producing said sound effect, based on said sound source information;
- an output means for converting said control signal into said sound effect and outputting said sound effect; and
- a clutch signal generator for generating a clutch signal indicating an engagement state of a clutch and outputting said clutch signal to said processor,
- wherein said processor calculates a declutching time based on said clutch signal and changes a gain of said control signal when said declutching time is within a predetermined time and when a predetermined parameter regarding said sound source information exceeds a predetermined value.

5. A sound effect producing apparatus according to claim 4, wherein said clutch signal generator generates said clutch signal, depending on a pressed state of a clutch pedal that is connected to said clutch.

6. A sound effect producing apparatus according to claim 4, wherein said sound source information includes an engine rotational frequency, and said predetermined parameter includes a change of said engine rotational frequency per unit of time.

7. A sound effect producing apparatus according to claim 6, wherein said processor is configured to change said gain of said control signal, depending on said change of said engine rotational frequency per unit of time, said gain includes gain values during clutching and gain values during declutching, and said gain values during declutching include a gain value when said declutching time is within said predetermined time and when said change of said engine rotational frequency per unit of time exceeds said predetermined value, and a gain value for other situations.

8. A sound effect producing apparatus according to claim 4, wherein said sound source information includes vehicle velocity, and said predetermined parameter includes a change of an engine rotational frequency per unit of time.

9. A sound effect producing apparatus according to claim 8, wherein said processor is configured to change said gain of said control signal depending on vehicle acceleration, such that a value of gain, when said declutching time is within said predetermined time and said change of said engine rotational frequency per unit of time exceeds a predetermined value, is made larger than a value of gain for other situation.

* * * * *